(12) United States Patent
Sankrithi et al.

(10) Patent No.: US 6,405,975 B1
(45) Date of Patent: Jun. 18, 2002

(54) AIRPLANE GROUND MANEUVERING CAMERA SYSTEM

(75) Inventors: Mithra M. K. V. Sankrithi, Seattle; David W. McKenna, Everett; Mannon L. Wallace, Jr., Lynnwood; Ronaldo O. Cabrera, Renton; Gary D. Reysa, Bellevue; Gerhard E. Seidel, Renton; John Yeeles, Issaquah; John Cashman, Redmond, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/135,992

(22) Filed: Aug. 18, 1998

Related U.S. Application Data

(63) Continuation-in-part of application No. 08/999,824, filed on Dec. 19, 1995.
(60) Provisional application No. 60/009,148, filed on Dec. 22, 1995.

(51) Int. Cl.[7] .............................................. B64C 25/50
(52) U.S. Cl. ...................................... 244/1 R; 244/50
(58) Field of Search ........................... 244/1 R, 50, 115, 244/75 R; 348/143, 144, 140; 340/975, 973

(56) References Cited

U.S. PATENT DOCUMENTS

| | | | | |
|---|---|---|---|---|
| 3,596,269 A | * | 7/1971 | Laska | 340/518 |
| 3,610,821 A | | 10/1971 | Narbaits-Jaureguy | 348/117 |
| 3,711,638 A | * | 1/1973 | Davies | 348/143 |

(List continued on next page.)

FOREIGN PATENT DOCUMENTS

| | | | | |
|---|---|---|---|---|
| AU | 643569 | * | 5/1992 | 244/1 R |
| DE | 2122830 | * | 5/1971 | 244/1 R |
| DE | 2632919 | * | 3/1977 | 244/1 R |
| DE | 2951282 | * | 6/1981 | 244/1 R |
| DE | 3144952 | * | 5/1983 | 244/1 R |
| DE | 197 13 373 | | 5/1998 | |
| DE | 197 52 175 | | 5/1998 | |
| EP | 104987 | * | 4/1984 | 244/1 R |

(List continued on next page.)

OTHER PUBLICATIONS

Sperry Flight Systems, Sperry's control displays system; digital electronics keep scout crews flying heads up. Aviation Week & Space Technology, Aug. 1981.*
Boeing 737, "600, 700, 800", Next generation flight deck, Nov. 1996.*
McDonnell Douglas, "The Advanced Crew Station AV–8B". p. 16, unknown.*
British Aerospace, "The Advanced Flight Deck", AIAA Conference, Feb. 1979.*

(List continued on next page.)

Primary Examiner—Peter M. Poon
Assistant Examiner—Kevin Jakel

(57) ABSTRACT

A system for aiding ground maneuvering of an airplane. The system includes at least one camera mounted on the airplane for generating video images of at last one gear with tires, preferably a main or nose landing gear and the surrounding ground. The cockpit of the airplane includes a video display device that displays the generated video images and a user interface that allows selection of the format for displaying the generated video images. A camera mounted within a moveable component of the airplane is mounted on a movable device that compensates for component movement. The system also includes a display generator for generating in real-time superimposed oversteer targets on the displayed video images. The video images with oversteer targets assist the pilot in determining the airplane's actual position relative to runways, taxiways, obstacles and other ground features and to maneuver a plane with a wide wheel track long wheelbase, or both accordingly.

20 Claims, 21 Drawing Sheets

U.S. PATENT DOCUMENTS

| | | | | |
|---|---|---|---|---|
| 3,934,250 A | | 1/1976 | Martin, Jr. | 342/42 |
| 4,214,266 A | | 7/1980 | Myers | 348/140 |
| 4,218,702 A | | 8/1980 | Brocard et al. | 348/144 |
| 4,529,150 A | * | 7/1985 | Owen et al. | 244/1 R |
| 4,614,316 A | * | 9/1986 | Marvin et al. | 244/1 R |
| 4,633,376 A | * | 12/1986 | Newman | 362/470 |
| 4,752,791 A | | 6/1988 | Allred | 396/13 |
| 4,816,828 A | | 3/1989 | Feher | 340/945 |
| 4,860,007 A | * | 8/1989 | Konicke et al. | 340/173 |
| 4,887,779 A | * | 12/1989 | Large | 244/1 R |
| 4,918,442 A | | 4/1990 | Bogart, Jr. | 340/961 |
| 4,994,681 A | | 2/1991 | Mann | 250/559.3 |
| 5,059,946 A | | 10/1991 | Hollowbush | 340/435 |
| 5,067,667 A | * | 11/1991 | Shivers, Jr. | 244/1 R |
| 5,222,690 A | | 6/1993 | Jeffords | 244/1 R |
| 5,307,238 A | * | 4/1994 | Marcus | 361/428 |
| 5,743,487 A | * | 4/1998 | Rice | 244/1 R |
| 5,797,562 A | * | 8/1998 | Wyatt | 244/1 R |
| 5,806,789 A | * | 9/1998 | Boulware et al. | 244/1 R |
| 5,813,744 A | * | 9/1998 | Altebarmakian | 362/62 |

FOREIGN PATENT DOCUMENTS

| | | | | |
|---|---|---|---|---|
| EP | 0 476 748 A1 | | 3/1992 | |
| FR | 889345 | * | 1/1944 | 244/1 R |
| FR | 2 007 336 | | 1/1970 | |
| FR | 2 354 924 | | 1/1978 | |
| FR | 2618122 | * | 7/1989 | 244/1 R |
| FR | 2 752 807 | | 9/1996 | |
| GB | 541895 | * | 12/1941 | 244/1 R |
| GB | 2 006 145 A | | 5/1979 | |
| GB | 2161121 | * | 1/1986 | 244/1 R |
| GB | 3133148 | * | 1/1989 | 244/1 R |

OTHER PUBLICATIONS

SU 613146 * 6/1978 .............. 244/1 R

Lockheed Horizons, Lockheed flight deck for L–1011 vol. 14, 1983.*

Norris G. et al. "Boeing's Long Stretch", Flight International, GB, Reed Business Information, Haywards Heath, vol. 152, No. 4603, pp. 36–41, XP000721548, ISSN: 0015–3710, Dec. 1997.

"Ball Aerospace & Technologies . . . ," *Speednews*, Apr. 19, 1996, p. 4.

"Ball wins Boeing camera deal for 777–300 stretch," *Flight International*, Apr. 24–30, 1996, p. 10.

"Cameras for Blind Spots," *Aviation Week & Space Technology*, Apr. 15, 1996, p. 51.

David Hughes, "Boeing, United pursue major cockpit advance," *Aviation Week & Space Technology*, Nov. 23, 1992, p. 89.

David W. McKenna, "Use of 60% Scale Airplane for Low Cost Airport Maneuver Test," 24th Annual SFTE Symposium, Seattle, Washington, Jul. 27, 1993.

Bruce D. Nordwall, "Filter Center—Boeing Plans to Equip . . . ," *Aviation Week & Space Technology*, Apr. 22, 1996, p. 63.

Guy Norris, "Boeing defines plans for a 'simple' 777–300 stretch," *Flight International*, Dec. 13–19, 1995, p. 11.

Edward H. Phillips, "Airline Outlook—Down and Locked?" *Aviation Week & Space Technology*, Apr. 22, 1996, p. 17.

"TV Guides," *Flight International*, Jun. 29–Jul. 5, 1994, p. 52.

* cited by examiner

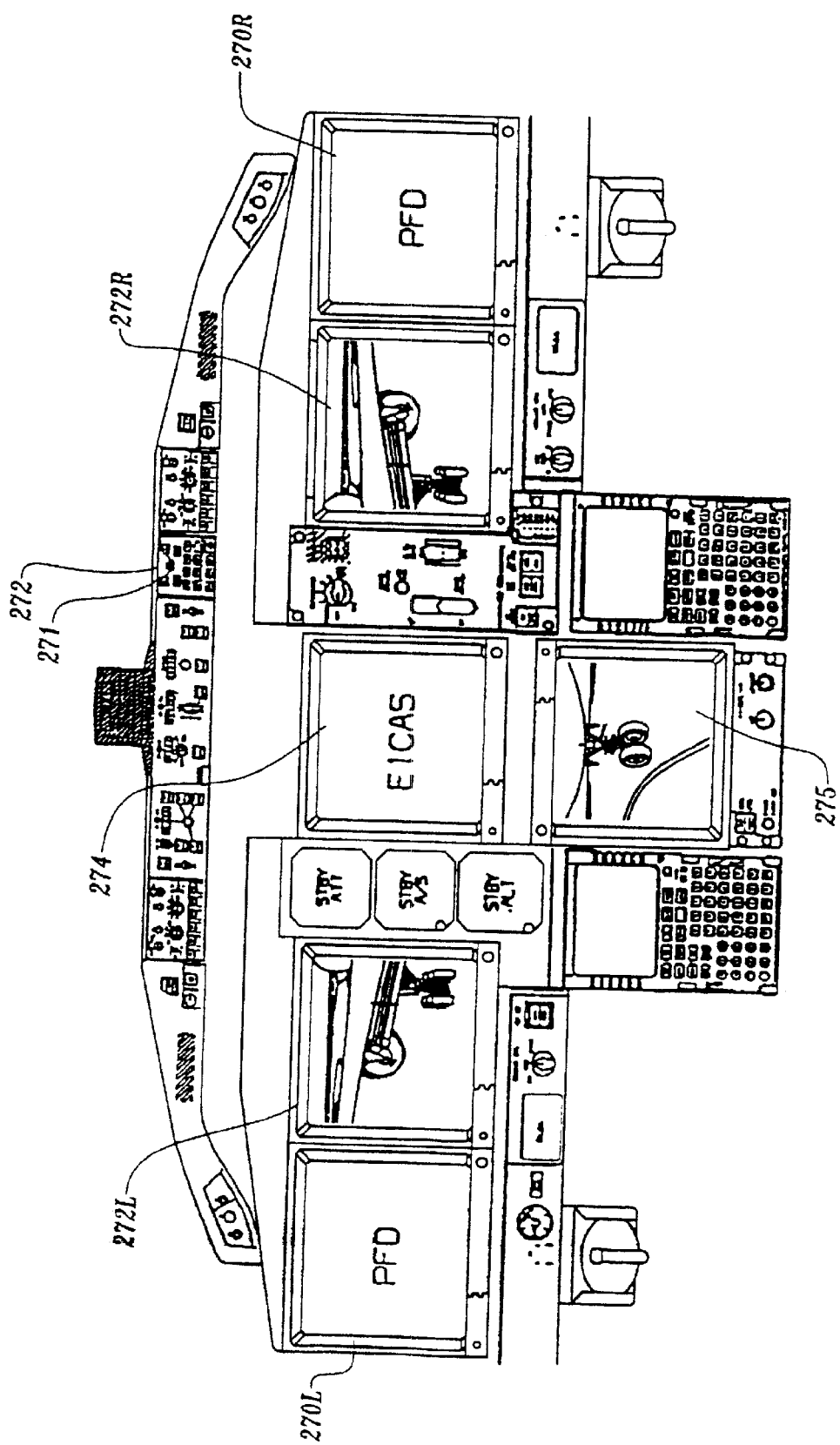

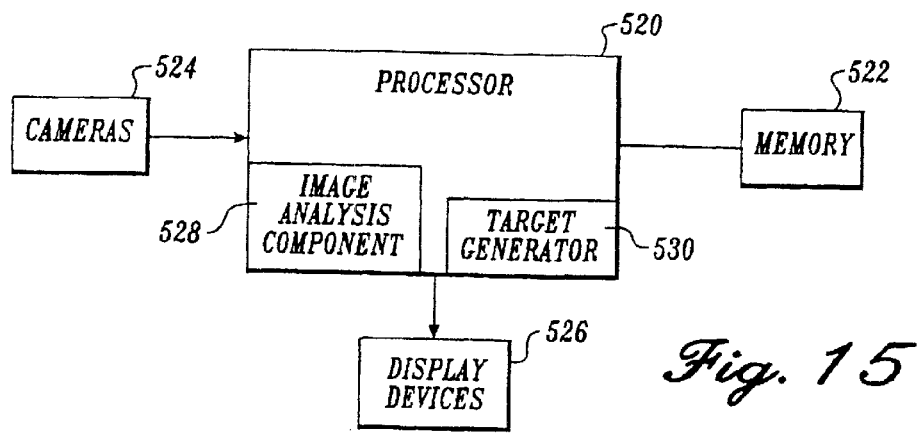
Fig. 15
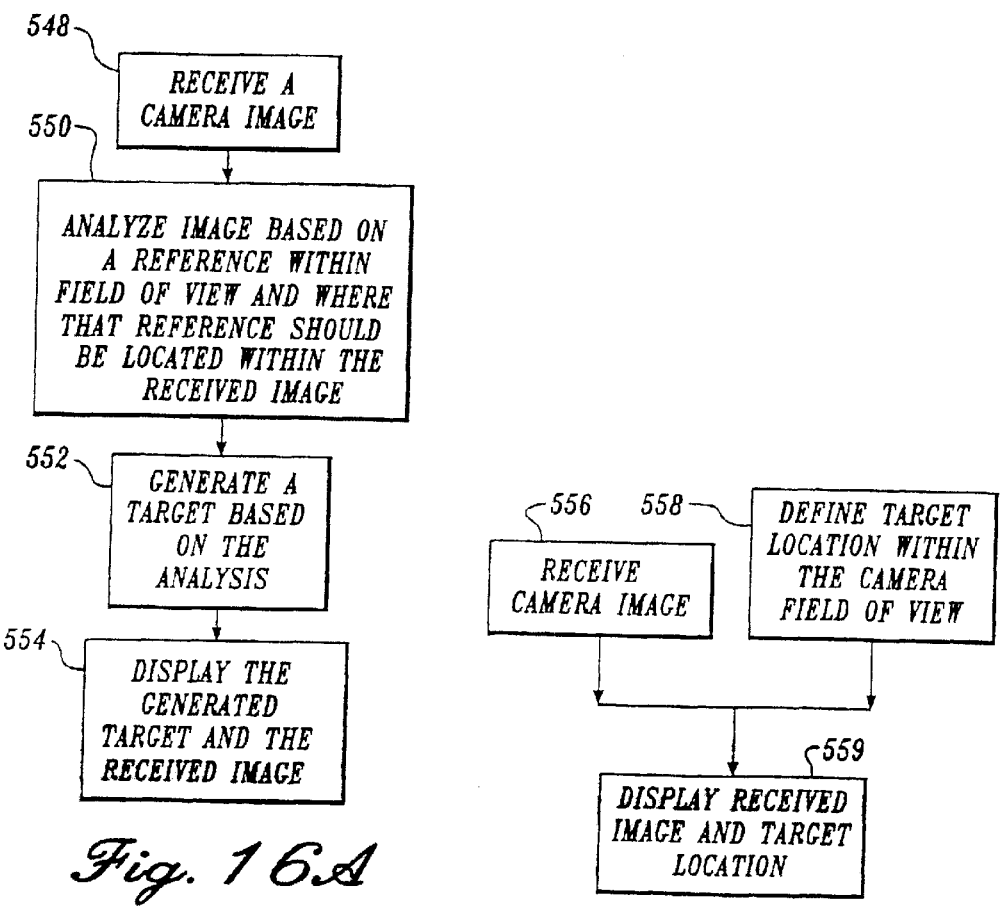
Fig. 16A
Fig. 16B

AIRPLANE GROUND MANEUVERING CAMERA SYSTEM

CROSS REFERENCE TO RELATED APPLICATION

This application is a continuation-in-part of U.S. patent application Ser. No. 08/999,824, filed Dec. 19, 1996, which claimed the benefit of U.S. Provisional patent application Ser. No. 60/009,148, filed Dec. 22, 1995.

FIELD OF THE INVENTION

This invention relates to airplanes and more particularly to airplane ground maneuvering systems.

BACKGROUND OF THE INVENTION

As airplanes get larger, the distance between the main landing gear and nose landing gear (i.e., wheelbase and distance between each main landing gear (track)) becomes greater. As a result, turning maneuvers require more space. Because most airports were constructed to handle smaller, more maneuverable airplanes with shorter wheelbases and tracks, large airplane maneuvering becomes even more difficult. The restricted widths of the runways and taxiways, coupled with greater airport congestion, have made it progressively more difficult for pilots of large commercial airplanes to make tight maneuvers. Maneuvering large airplanes is difficult because of a lack of feedback to the pilots about relative positioning of the landing gear on the ground. The lack of feedback occurs because an airplane's landing gear are located beneath the fuselage or wings. Accurate knowledge of the location of landing gear, specifically the tires and wheels of the landing gear, is particularly important when maneuvering in tight spaces at crowded airports. A pilot's ability to see runway and taxiway edges, ground service vehicles and potential obstructions is also very limited in large airplanes.

In smaller airplanes, pilots steer the airplane such that the cockpit of the airplane remains over a painted nosewheel guideline or the estimated nosewheel location remains over the nosewheel guideline while executing taxiway-to-taxiway turns. Pilots of large airplanes typically use "judgmental oversteering," deliberately making the nosewheel follow a path outside of the nosewheel guideline, thereby reducing the probability that the wheels of the inside turning main landing gear will run off of the pavement or hit edge lights, flags or signs. Precise control of judgmental oversteering is prone to error and to occasional incidents of wheels running off the runway/taxiway and causing damage to the airplane or to ground installations in large airplanes with large distances between the pilot and the main landing gear.

One method for lessening the chances of the above-mentioned oversteering problems occurring is the addition of large radius airplane nosewheel guidelines that are offset relative to existing centerline-to-centerline faired circular arc guidelines. Because this method is airport-dependent rather than airplane-dependent, it has the potential disadvantage of misguiding small airplanes.

Large airplanes with long wheel bases and wide main gear track also face challenges in other types of ground maneuvers such as gate entry maneuvers and runway or turnpad U-turn maneuvers.

SUMMARY OF THE INVENTION

The present invention provides a system for aiding the maneuvering of airplanes. The system includes at least one, and preferably several, cameras for generating video images. The camera(s) is mounted on the airplane so that it can simultaneously view at least one landing gear, preferably a main or nose landing gear, and the ground surrounding it to allow the pilot to safely steer the airplane. The system also includes a video display within the cockpit of the airplane for displaying the generated video images and a user interface for selecting the timing and optionally the format for displaying the generated video images.

In accordance with other aspects of this invention, a camera is mounted on the belly, and/or on the horizontal or vertical stabilizer of the airplane. The belly-mounted camera is positioned either between the nose landing gear and the two main landing gear, between the tail of the airplane and the two main landing gear, forward of the nose landing gear or under a wing of the airplane.

In accordance with further aspects of this invention, a camera is mounted on a movable device located within a moveable component of the airplane. The movable device compensates for component movement, such that the generated video images are substantially unaffected on the display screen when the component moves.

In accordance with still other aspects of this invention, the system includes an image motion compensation processor and a display generator for aiding the ground maneuvering of airplanes with wide wheel tracks, long wheelbases, or both. The image motion compensation processor determines the airplane's position with respect to airport surface markings and equipment displayed within the displayed video images. The display generator generates and displays a superimposed oversteer target on the displayed video images based on the determined airplane position with respect to airport surface markings and equipment. The oversteer target may also be the corner or edge of a carefully selected field of view. The airplane is properly oversteered and executes a guided oversteer turn when the oversteer target is directed by the pilot to track along a painted nosewheel guideline or centerline which is visible on the display. The display generator also generates and displays superimposed images on the displayed video images for identifying the location of the main landing gear of the airplane, the lateral clearance of airport surface markings and equipment, and the contact point of the landing gear wheels and the airport surface.

In accordance with still further aspects of this invention, the cockpit display device presents video images from multiple cameras in a split-screen format or allows pilots to select views individually.

As will be readily appreciated from the foregoing summary, the invention provides a system for allowing pilots to accurately steer large airplanes during taxiway to taxiway turns, U-turns, and gate maneuvering turns. Thus, this system reduces the chances of large airplanes maneuvering off the designated taxiway or runway, into ground service vehicles, ground personnel or into ground installations. This system can also provide visibility of turnaround activities.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 6A and 6B are schematic views of cockpit display device layout and controls, and camera light controls in an airplane incorporating the present invention;

FIG. 15 is a schematic diagram of a system formed in accordance with the present invention;

FIGS. 16A and B are flow diagrams that illustrate processes performed by the system shown in FIG. 15;

DETAILED DESCRIPTION OF THE PREFERRED EMBODIMENT

In accordance with this invention, a system for aiding the ground maneuvering of airplanes, particularly large airplanes, in which a pilot located in the cockpit of the airplane is unable to see the ground adjacent to the landing gear is provided. The system includes at least one and preferably multiple video cameras positioned to view the landing gear of the airplane, a video display monitor located in the cockpit of the airplane and a user interface for selecting the timing and optionally the format of the display.

Figure 1:
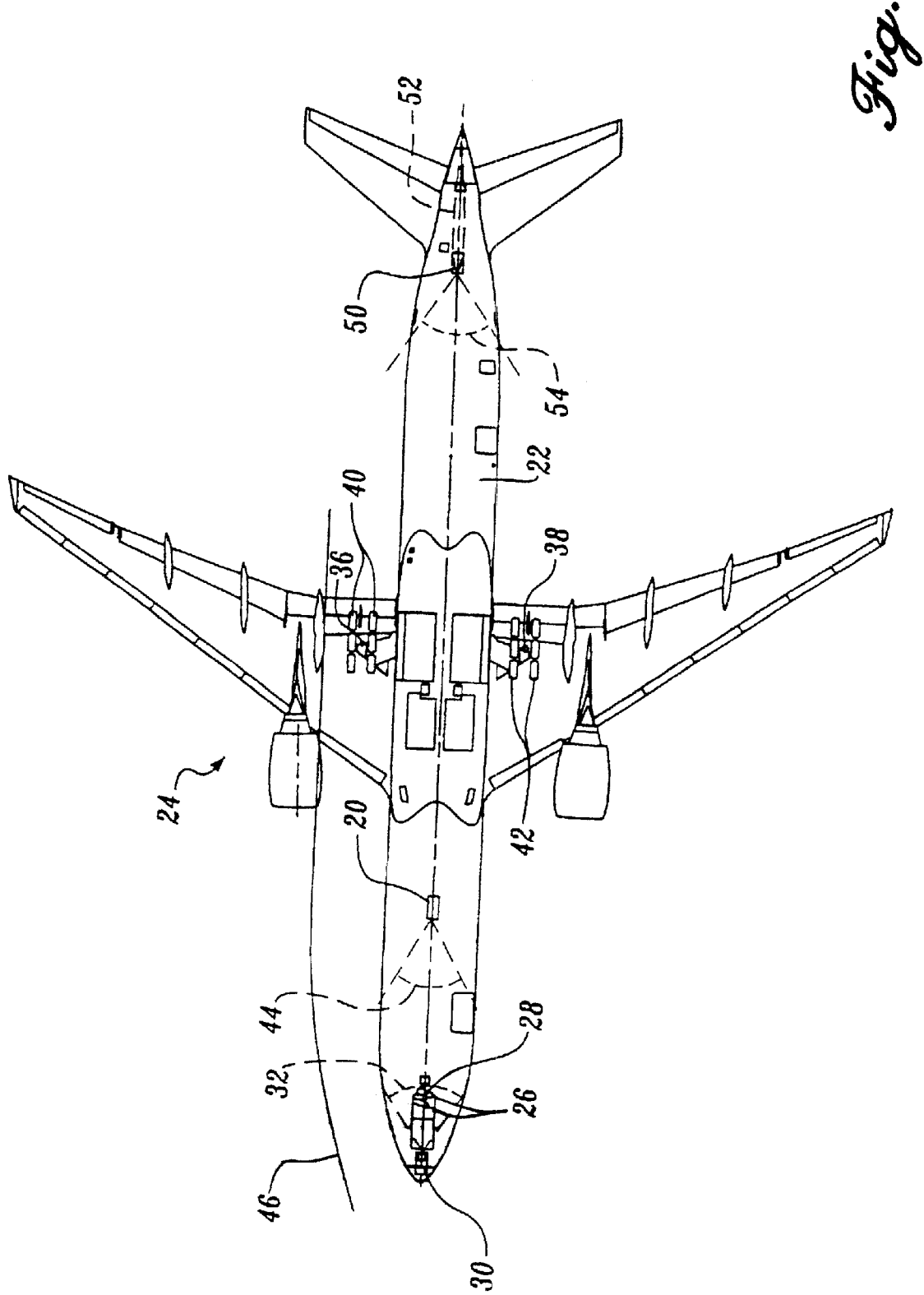
FIGS. 1 and 2 are plan views of the bottom of an airplane showing the position of cameras mounted in accordance with the present invention.

FIG. 1 illustrates a first camera layout that includes first, second and third video cameras 20, 30 and 50. The first video camera 20 is located on the underside 22 of the fuselage of the airplane 24 so as to provide a view of the nose landing gear 28. The first video camera 20 is located between the nose landing gear 28 and a line that extends between the left wing main landing gear 36 and the right wing main landing gear 38 of the airplane. The left and right wing landing gear 36 and 38 combine to form the main landing gear of the airplane. The first video camera 20 is oriented so as to view the nose landing gear 28 from behind and, thus, is particularly adapted for viewing ahead of the airplane 24. The view angle 44 of the first video camera 20 encompasses the tires 26 of the nose landing gear 28, and the edges of a runway, taxiway, or apron when they are located within 20 feet from the tires 26 of the nose landing gear 28. The images generated by the first video camera 20 allow a pilot to visually judge: a desired amount of oversteer for taxiway turns; gear to pavement edge margin at the end of a runway or turnpad U-turn; and stopping position at a gate nosewheel mark. The exact placement of the first video camera 20 will depend upon airplane structure, and the camera's quality, field of view and level of detail. Based on the capabilities of presently available cameras, the first video camera 20 is preferably installed between 10 and 100 feet behind the nose landing gear 28. The main and nose landing gear includes all structural elements, retractable elements and wheels and tires. The landing gear elements of visual importance to the pilot are the tires/wheels of the landing gear viewed by the cameras.

The second video camera 30 is mounted on the underside of the fuselage of the airplane 24, forward of the nose landing gear 28, and faces aft and down. Preferably, the second video camera 30 includes a wide-angle or fisheye lens that has a viewing angle 32 wide enough to encompass the nose landing gear 28 and the edges of a runway or taxiway when they are located within approximately 20 feet around the tires 26 of the nose landing gear 28. An advantage of locating the second video camera 30 forward of the nose landing gear 28 is so that this video camera can view the wheels of all of the landing gear.

The third video camera 50 is located substantially on the centerline of the airplane fuselage on the leading edge of the vertical tail 52 of the airplane 24. Like the first video camera 20, the third video camera 50 views forward. As a result, the images produced by the third video camera 50 provide prospective (forward looking) guidance. The viewing angle 54 of the third video camera 50 is adjusted so that the tires 40 and 42 of the left and right wing landing gear 36 and 38 are simultaneously visible. A pilot viewing an image produced by the third video camera 50 can visually judge main landing gear to pavement edge margins as needed in taxiway turns and at the start of runway or turnpad U-turns.

Figure 2:
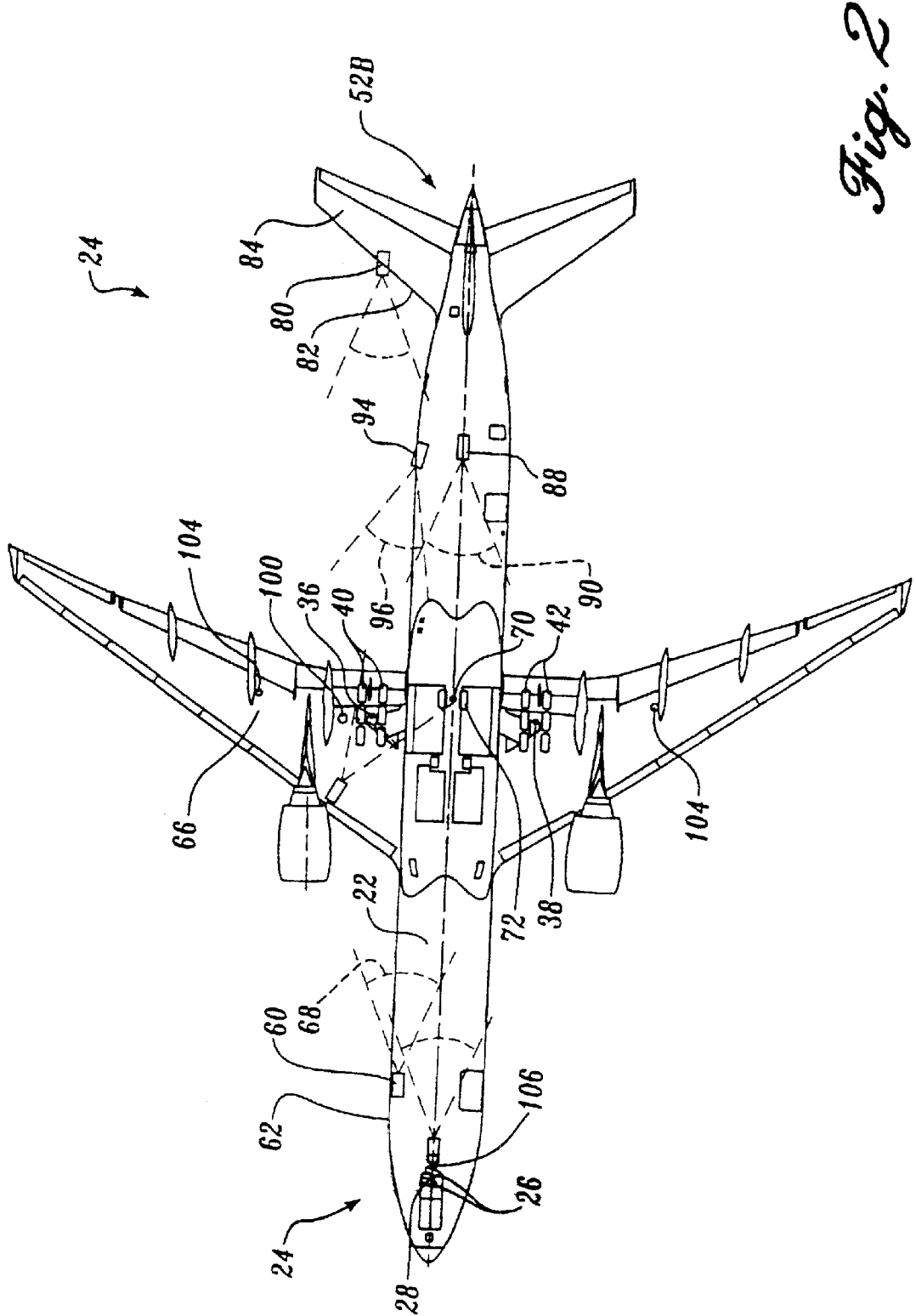

FIG. 2 illustrates a second (alternative) camera layout that includes fourth, fifth, sixth, seventh and eighth video cameras 60, 80, 88, 94 and 100 for aiding in ground maneuvering. The fourth video camera 60 is located under the port side 62 of the airplane 24. The fourth video camera 60 is directed aft and slightly under the left wing 66 of the airplane 24 toward the left wing gear 36. The sweep or viewing angle 68 of the fourth video camera 60 may be narrow allowing this video camera 60 to only view the tires 40 of the left wing landing gear 36 and the left edge of a runway or may be wide and encompass the tires 72 of optional center post main landing gear 70, possibly the tires 42 of the right wing landing gear 38 as well as the tires 40 of the left wing landing gear 36. Alternatively or additionally, the fourth video camera 60 could be mounted on the starboard side of the airplane 24.

The fifth video camera 80 is located at the leading edge 82 of the horizontal stabilizer 84. The fifth video camera 80 is focused forward and downward for viewing of the left wing landing gear 36. Alternatively or additionally, the fifth video camera 80 could be mounted on the starboard side of the airplane 24. The sixth video camera 88 is located substantially on the centerline of the fuselage 22 of the airplane 24 between the main landing gear and the underside of the aft fuselage section 52B. The sixth video camera 88 has a viewing angle 90 for generating images of the tires 26 of the nose landing gear 28, the tires 72 of the center post main landing gear 70, the tires 40 and 42 of the left and right wing landing gear 36 and 38 and the runway or taxiway edges, in the forward direction. While some foreshortening of the image seen by a pilot on a cockpit display device is likely, the sixth video camera 88 provides a substantial amount of real-time information, particularly about the crosswise position of the airplane 24 on a runway or taxiway and obstacles ahead.

The seventh video camera 94 is located on the port side of the fuselage 22 of the airplane 24 between the aft fuselage section 52B and the main landing gear 36 and 38. The seventh video camera 94 is pointed in a port forward quarter direction and has a viewing angle 96 for generating images of the left wing landing gear 36 and center post landing gear 70. Alternatively or additionally, the seventh video camera 94 may be mounted on the starboard side of the airplane 24. The eighth video camera 100 is located on the underside of a wing and pointed downward. Preferably, the eighth video camera 100 has a wide-angle or fisheye lens, giving the camera a wide viewing angle. The seventh video camera 94 generates a top down view of left main landing gear 36 and the surrounding taxiway/runway. Various other camera locations may be chosen depending upon the images desired for presentation to the pilot. Various mountings for these cameras are shown in FIGS. 9–13 and described in detail below. As will be readily appreciated by those skilled in camera systems, various types of cameras may be used, for example, low-light or infrared/thermal cameras could be used for night operations. Illumination of the main landing gear 36 and 38, the nose landing gear 28 and the surrounding ground is provided by main landing gear area illuminating lights 104 and nose landing gear area illuminating lights 106.

In accordance with a preferred embodiment of the invention, each camera is located at a suitable viewing distance from the nose, main or center post landing gear and the camera's lens is selected to have a viewing angle which simultaneously views the tires of the landing gear and at least 15 feet of ground surrounding the tires. Fifteen feet corresponds with the taxiway edge safety margin for group IV and V airplanes, as specified in Federal Aviation Administration Advisory Circular AC150/5300-13, and the equivalent 4.5 meter taxiway edge clearance for ICAO code D and E airplanes, as specified in ICAO Annex 14, Volume 1. This ensures that the pilot will see the runway or taxiway edge displayed on the cockpit screen before the tires and wheels of the airplane get dangerously close to the edge.

Figures 3A, 3B:
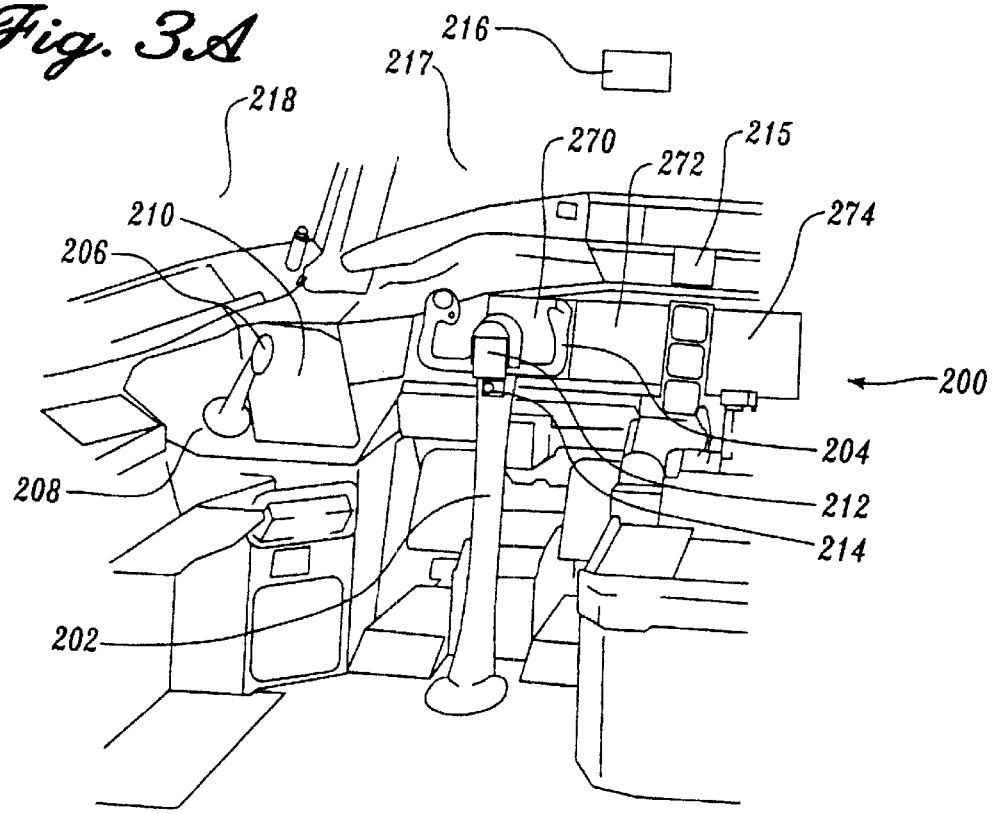
FIG. 3A is a schematic view of a cockpit of an airplane illustrating possible display screen locations for viewing the images generated by the cameras shown in FIGS. 1 and 2.
FIGS. 3B and 3C are schematic views of a steering tiller assembly.

FIG. 3A is a view of a typical airplane cockpit 200 of a large commercial airplane that is equipped with the present invention. The airplane cockpit 200 includes a control column 202 with an attached yoke 204. A nosewheel steering tiller 206 is mounted on a port side bulkhead 208. The nosewheel steering tiller 206 is used by the pilot to control the nose landing gear of the airplane. Another tiller may be provided on the starboard side of the cockpit for a copilot or First Officer. Display devices, such as cathode ray tube (CRT) monitors or flat panel displays (such as LCDs or AMLCDs) are mounted at various locations within the cockpit 200 for displaying images from one or more of the cameras described above, and for other purposes. In all likelihood, not all of the illustrated display devices would be installed or used on a single airplane. One illustrated display device is a CRT or flat panel monitor 210 mounted adjacent to and in board from the steering tiller 206. Another illustrated display device is a flat panel display 212 that is permanently or temporarily fastened to the yoke 204 or the column 202. Also, illustrated in the cockpit 200 is a set of forward mounted display devices 270, 272 and 274. The forward mounted display devices 270, 272 and 274 allow viewing of primary flight instrumentation, navigation instrumentation and engine/warning instrumentation. One or more of the forward mounted display devices 270, 272 and 274 can be selected for use during taxiing to display real-time imagine produced by the externally mounted cameras. Preferably, each screen can be divided into two or more different segments, each segment showing a view from a different camera, or other input, such as a communications channel number, airfield chart or processor generated target images derived from some other visual data source. Also illustrated in FIG. 3A is a glareshield mounted display device 215 that may have pop-up, pop-down, clip-on, or fixed installation. A heads-up display device 216 projects a camera generated image onto a transparent flat glass or plastic surface that is mounted to provide a pilot view the front windshield 217 or the side window 218 above the tiller 206. Similar display installations could be provided for airplanes with mini-wheel, slider-wheel, or handbar type controllers. For an airplane with a sidestick controller (not shown), a flat panel display device can be mounted on or positioned adjacent to a front-panel mounted pull out tray-table.

FIG. 3A shows a display selection switch or knob 214 located on the column 202. The display selection switch or knob 214 allows a user to switch between multiple camera generated images. This selection switch could alternatively be located on the throttle or on the handle of the tiller 206, as shown in FIGS. 3A–3D described in more detail below. A clipboard (not shown) is mounted on top of the flat panel display for attaching pertinent documents, such as an airport diagram. Alternatively, checklists could be added to the flat panel display. Also, the surface of the flat panel may permit writing and erasure with suitable markers (e.g., whiteboard type markers). Obviously, within the scope of the invention, flat panel displays of a variety of types, sizes, shapes and aspect ratios may be used.

Most large commercial airplanes include a tiller (either wheel or crank) that provides nose wheel steering control to the pilot (sometimes, as is the case with the 777, both pilot and co-pilot). In one embodiment, as shown in FIG. 3B, the tiller 206 is a crank 207 with a football-shaped hand control knob 209 at its end. The crank 207 turns through ±251 degrees, while the knob 209 is free to rotate uninhibited through ±360 degrees, plus (i.e., you can spin it with the end of your finger and it will spin through several rotations limited only by frictional forces).

Figure 3C:
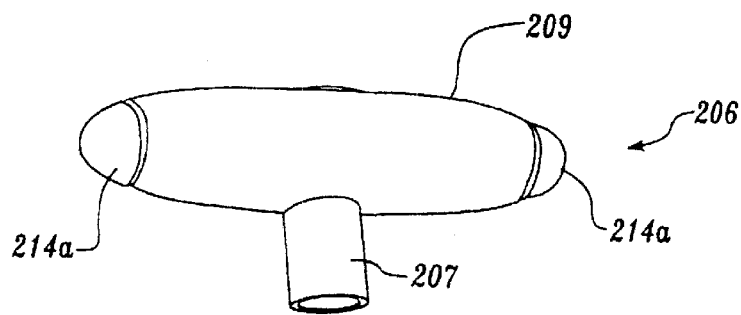

In one embodiment, as shown in FIG. 3C, the display selection switch 214a is located on both ends of the tiller knob 209. This switch 214a would allow the pilot(s) to switch between camera views using their thumb while steering the tiller knob 209 with the rest of the hand. Regardless of which way the knob 209 was grabbed, the switch 214a would always line up with the pilot's thumb. The switch 214a may also be located at just one end of the knob 209, on the bottom half of the knob 209, on the area of the knob 209 that surrounds the crank 207, or on a U-shaped portion of the knob 209 that surrounds the crank 207.

Figure 3D:
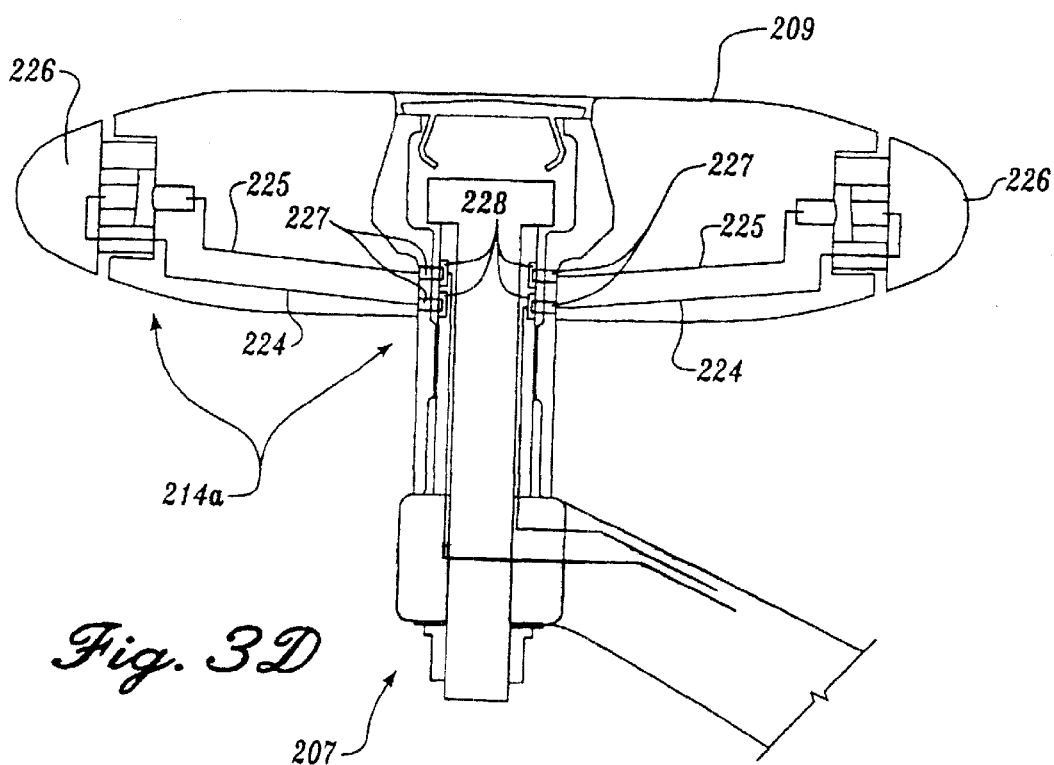
FIG. 3D is a cross-sectional view of the steering tiller assembly shown in FIGS. 3B and 3C.

FIG. 3D illustrates the switch 214a that includes positive (controller/power) and negative (ground) wires 224, 225 that run from the buttons 226 of the switch 214a to a pair of conductive rings 227 and 228 that act as the point of contact at the point of rotation of the tiller knob 209 and the crank 207. One pair of conductive rings 228 is on the inside of the tiller knob 209, the other pair 227 is on the outside of the crank 207. The conductive rings 227 on the outside of the crank 207 are connected to positive and negative wires that run down the crank 207 to a controller/power source and ground respectively. Both pairs of rings 227 and 228 rub against each other as the tiller knob 209 spins. When the button(s) 226 are compressed, the circuit is completed thus sending a camera view change command to a display controller. As can be readily appreciated by those of ordinary skill in the art, other electrical connections can be provided for this rotational configuration.

Figure 4:
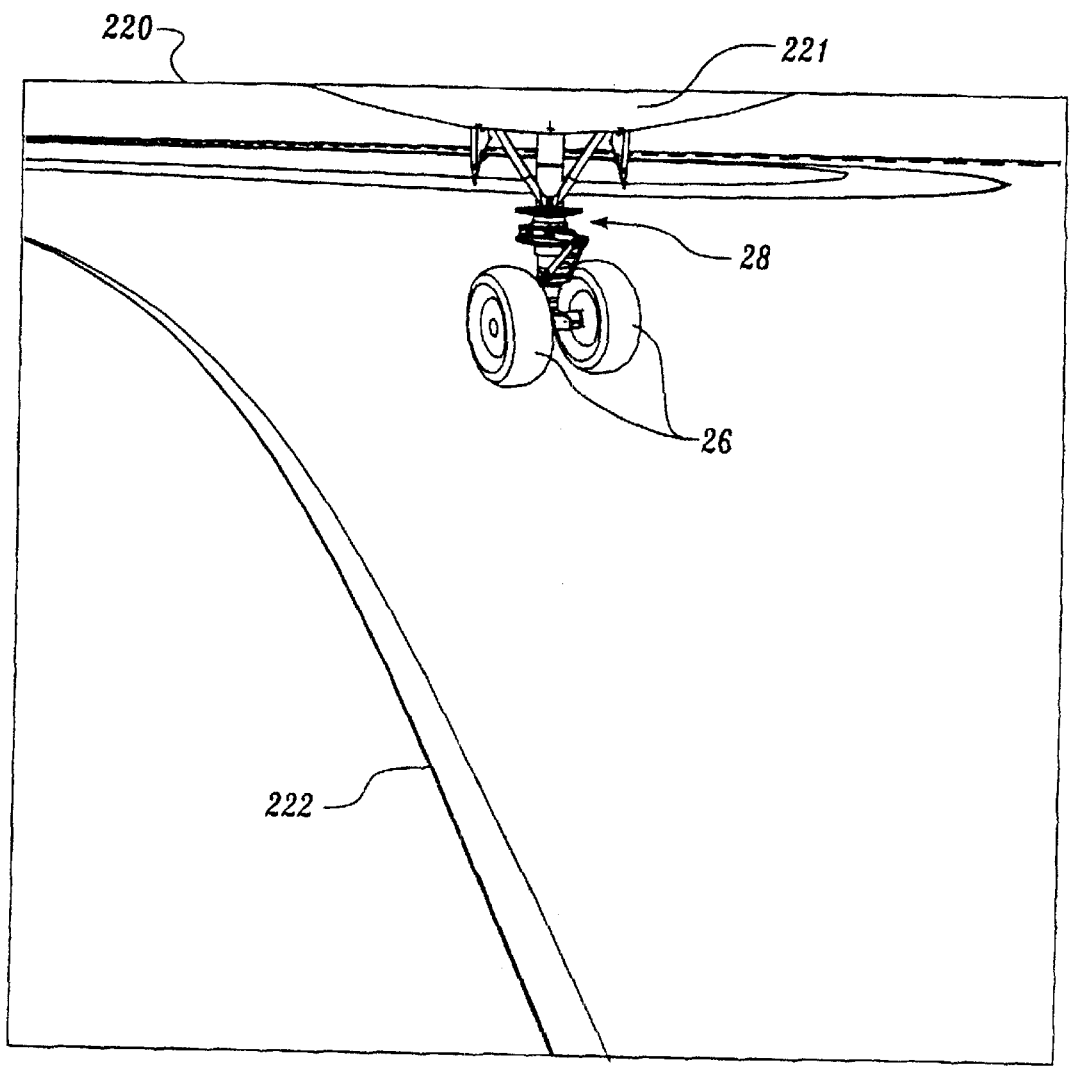
FIGS. 4 and 5 are exemplary cockpit images generated by some of the cameras located on an airplane in the positions illustrated in FIGS. 1 and 2.
Figure 5:
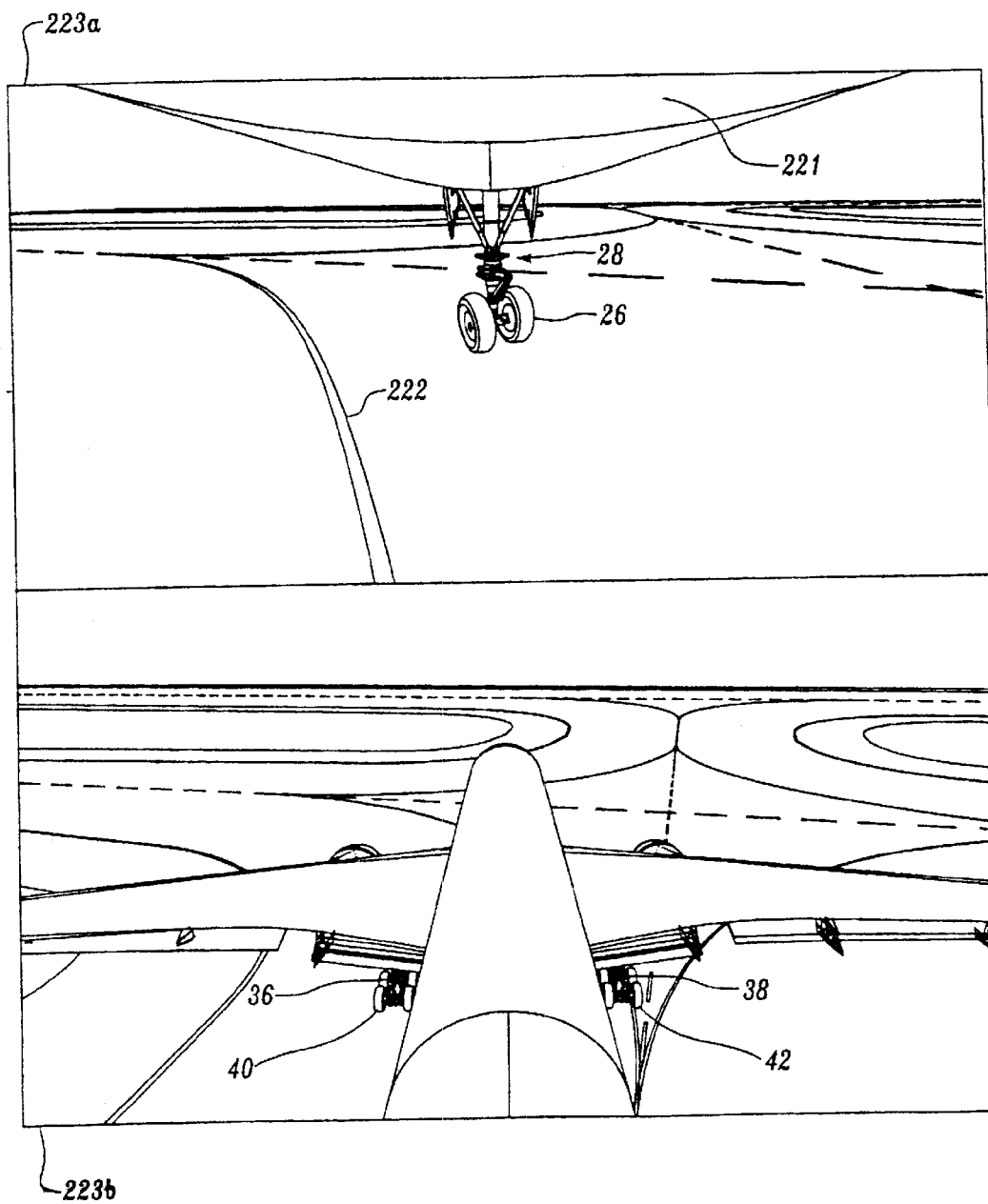

FIGS. 4 and 5 are examples of images generated by cameras located as described above. FIG. 4 illustrates an image 220 generated by a camera located behind the nose landing gear, such as the camera 20 shown in FIG. 1. The bottom of the airplane's fuselage 221 is just visible at the top of the image 220. In image 220 the pilot can easily judge distances and detail, such as where the nosewheel tires 26 are relative to a centerline 222. The FIG. 4 image 220 depicts a typical oversteer turn maneuver, a left turn with oversteer. The image 220 is displayed on one of the display devices illustrated in FIG. 3A and described above.

FIG. 5 illustrates a two-way split-screen image that includes a top portion 223a and a bottom portion 223b. A suitably scaled and/or clipped version of the video image shown in FIG. 4 and described above forms the top portion 223a. The bottom portion 223b of the video image shown in FIG. 5 is a scaled and/or clipped version of the image generated by a fin or vertical tail mounted camera, such as camera 50 shown in FIG. 1. The display selection switch or knob 214 or other display selection means (FIG. 3A) allows the pilot to determine what camera generated images are to be displayed in the top and bottom portions 223a and 223b.

FIG. 6A is an illustrative embodiment of a cockpit layout for displaying camera generated images. The layout shown in FIG. 6 is presently the configuration used in the Boeing 777 airplane family. The cockpit includes pilot and copilot Primy Flight Displays (PFDs) 270L and 270R, pilot and copilot Navigation Displays (NDs) 272L and 272R, an Engine Indication and Crew Alerting System (EICAS) display 274 and a Multi-Function Display (MFD) 275. In this example, the camera generated images of the left and right main landing gear are displayed on the left and right NDs 272L and 272R, respectively, and a camera generated image of the nose landing gear is displayed on the MUD 275.

Figure 6B:
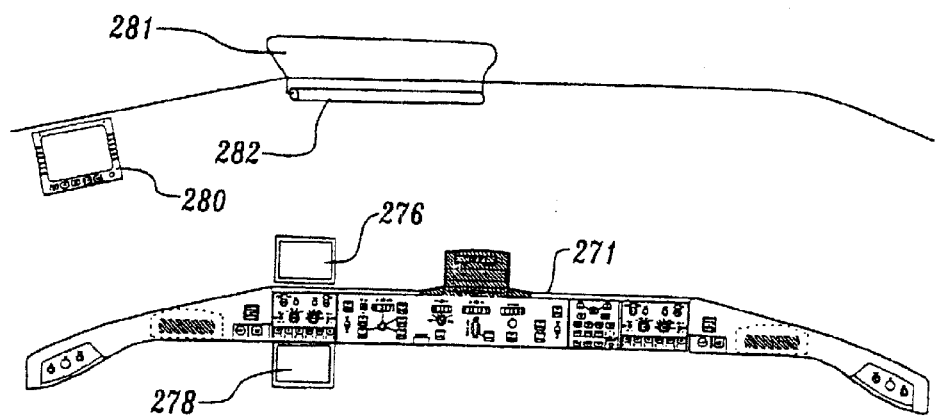

FIG. 6B illustrates alternate flat panel display locations. A flat panel display may be located above or below the glareshield panel 271, as shown by positions 276 and 278, attached to upper portion of the front windshield 217, as shown by position 280, integral with a visor, as shown by position 281, or in a roll-up screen, as shown by position 282. If the flat panel display in mounted in the visor, the support structure (not shown) for the display can be expandable in a slideable or foldable manner for increasing the size of the display. This support structure is similar to that found in vanity mirrors of some automobile makes. The flat panel display mounted on a roll-up screen is formed of a flexible LCD material that allows it to be rolled-up and still conduct electricity for producing viewable images. The roll-up screen may also be transparent for allowing the pilot to view out of the cockpit through the screen while viewing the images displayed thereon.

Figure 6C:
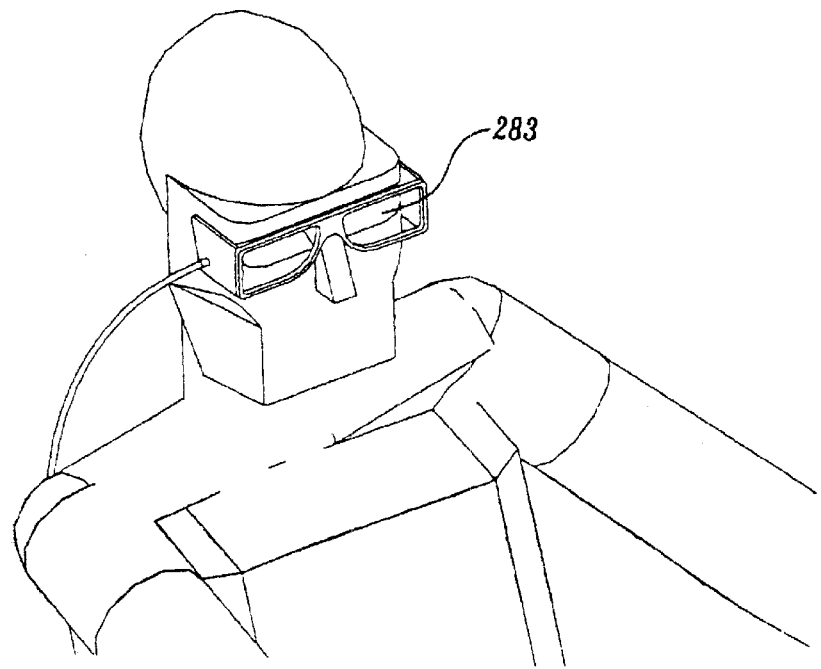
FIG. 6C is a perspective of a user wearing a head mounted display device.

FIG. 6C illustrates still another display device for presenting camera generated images to the pilot. The camera generated image is displayed as a semitransparent image on a pair of glasses 283. Virtual Vision™ produces a product called Sport™ that is a pair of glasses that performs the function described above.

Figure 7:
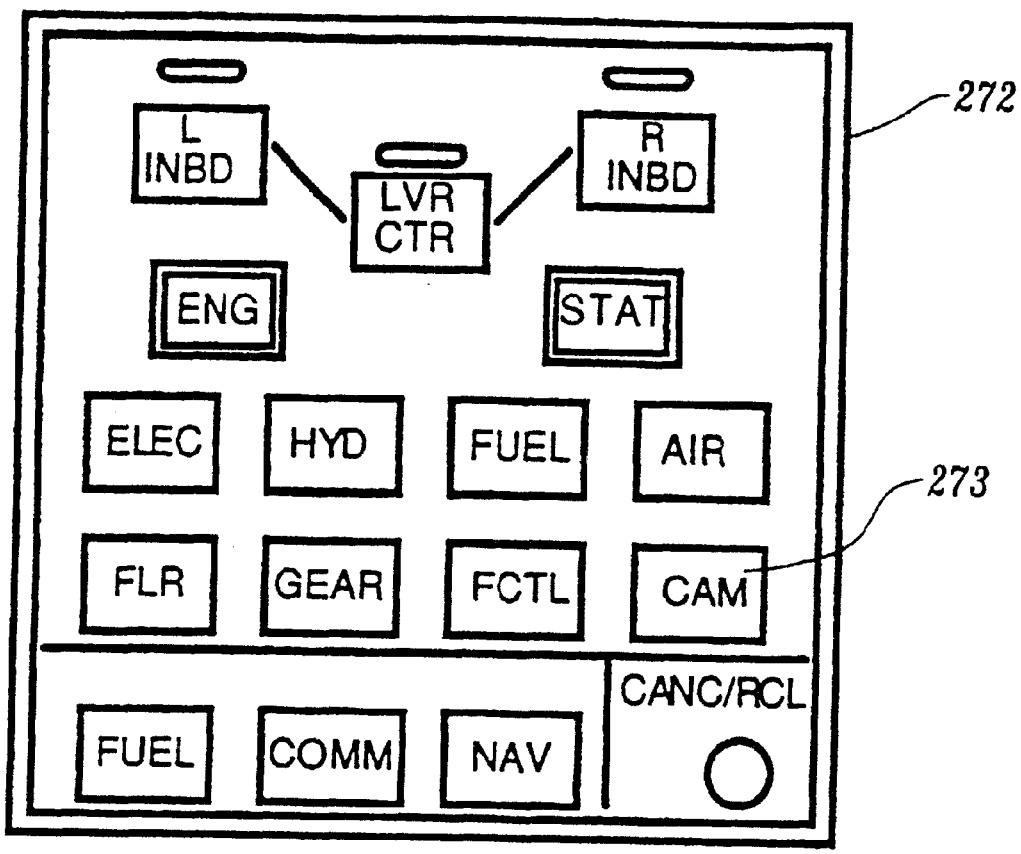
FIGS. 7 and 8 are schematic views of cockpit display device layout and controls, and camera light controls in an airplane incorporating the present invention.

As shown in FIG. 6A, a glareshield panel 271 is mounted above the displays. As shown in FIG. 7, mounted in the glareshield panel 271 is a control unit 272 that includes a camera section switch 273. By operating the camera select switch 273 a pilot selects the camera generated image to be displayed and where the camera generated images are to be displayed. For example, the camera select switch 273 is programmed with five modes. Every time the camera select switch 273 is activated the next mode is selected. Each mode is programmed with camera generated images being displayed on one or more of the cockpit display devices. For example, as shown in FIG. 6A, the first mode includes the image generated by a port stabilizer mounted camera displayed in the pilot ND 272L, the image generated by a starboard stabilizer mounted camera displayed in the co-pilot ND 272R and the image generated by a belly mounted camera directed at the nose gear displayed in the MFD 275. A second mode might include all the same camera generated images from the first mode displayed in a split screen format in the pilot ND 272L. As will be readily appreciated by those of ordinary skill in the art of image interfacing, the camera select switch 273 and/or display selection switch or knob 214 can be programmed numerous ways for allowing various image viewing within the cockpit.

Figure 8:
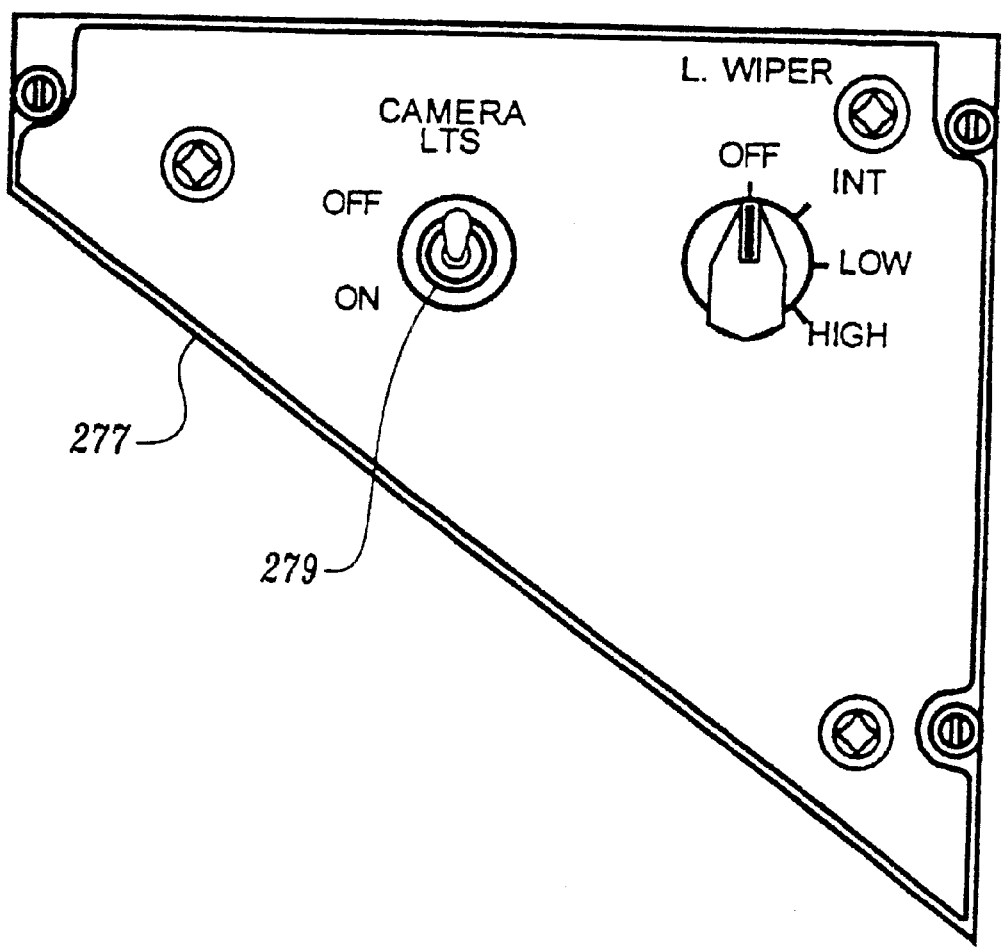

FIG. 8 illustrates an overhead panel 277 that is mounted in an overhead switch panel (not shown) in the cockpit. The overhead panel 277 includes a camera system lighting or illumination control switch 279. The illumination control switch 279 controls operation of lights 104 and 106 shown in FIG. 2. It is preferred to have controls for camera system lights separate from controls for landing or taxiing lights, as the pilot may wish to use different sets of lights under different ground operation or weather conditions. For example, the pilot may extinguish taxiing lights when facing another airplane, as a courtesy to avoid "blinding" the pilot of the other airplane. Such a pilot will probably want to have the camera system lights on during this time to maintain camera effectiveness.

Figure 9:
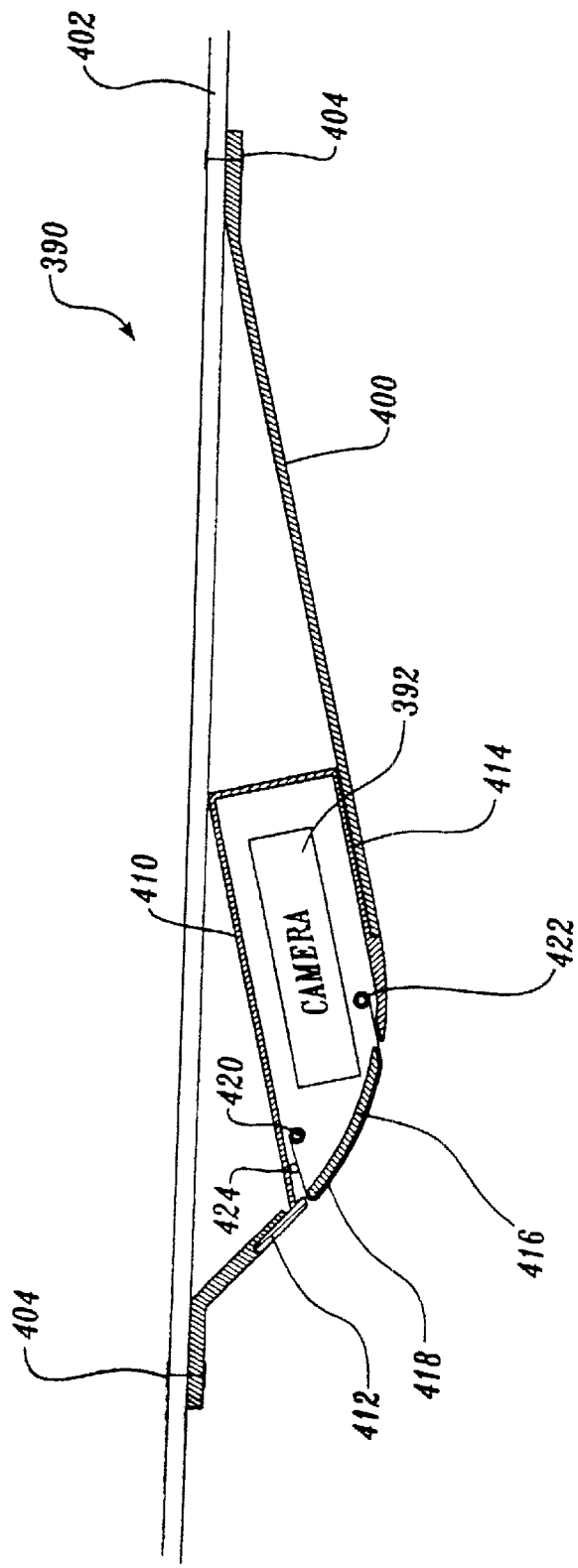
FIG. 9 is a cross-sectional view of a camera mounted externally to the skin of an airplane.

FIG. 9 is an illustrative external mount for a camera used in the present invention. A mounting structure 390 for a camera 392 is positioned on the underside of an airplane. The mounting structure 390 includes a frame 400 in the form of a skin blister attached to the fuselage skin 402 with rivets 404 or other suitable attachment devices. A preferred sheet material for the frame 400 is aluminum or a lightweight tough polymeric composite, such as graphite in a cured polymeric resin. A camera housing 410 is attached to the frame 400 so as to lie within the blister with adhesive layers 412 and 414, or other attachment means. The camera 392 mounted in the housing is pointed toward a transparent lens 416 that is covered by a transparent film 418. The transparent film 418 is transported between retaining reels 420 and 422. A rubbery squeegee type cleaner element 424 is located between the inner wall of the camera housing 410 and the transparent film 418. The film 418 is cleaned by operating the rollers 420 and 422 thereby causing the film 418 to move past the cleaner element 424. This cleaning operation could be automated to occur at preset time intervals or initiated by the pilot in the cockpit as needed. Devices for controlling the rollers 420 and 422 are well known in the art and are readily available. Alternately, even without the cleaner element 424, the transparent film 418 could be advanced one frame each time it gets dirty with total film replacement occurring at suitable maintenance intervals.

Figure 10:
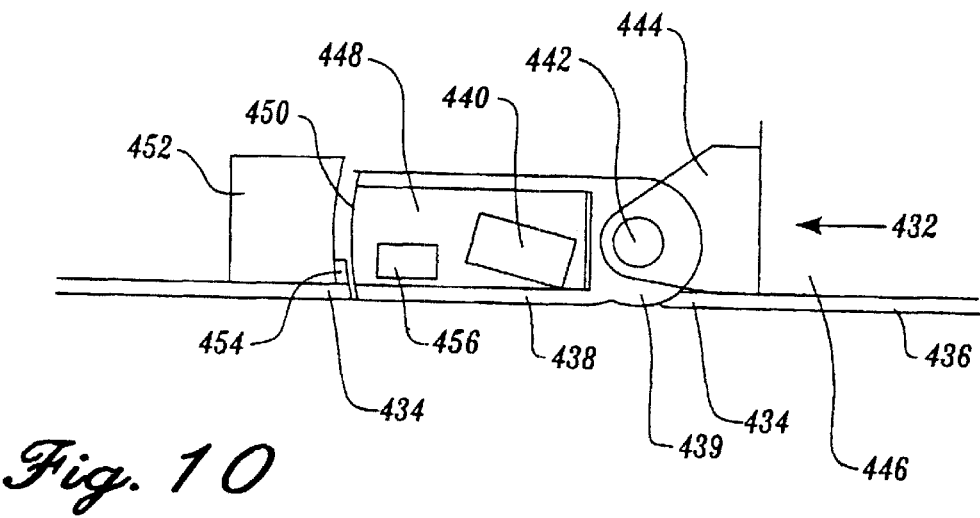
FIGS. 10 and 11 are cross-sectional views of a camera stowed within the airplane skin for storage and extended for use.
Figure 11:
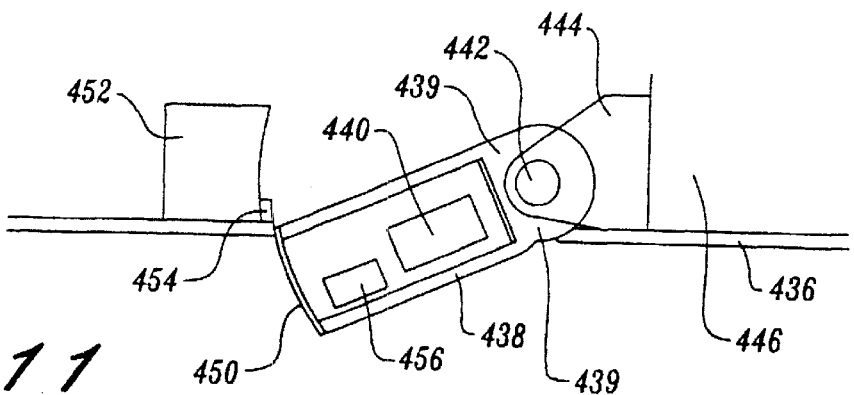

FIGS. 10 and 11 illustrate an alternative way of mounting a camera in an airplane in accordance with the invention. Specifically, FIGS. 10 and 11 illustrate a recessed mounting 432 for a camera 440 positioned on the underside of an airplane. The recessed mounting 432 includes a cutout 434 located in the fuselage skin 436. The camera 440 is positioned in a, camera housing 438. The camera housing 438 includes a generally circular protrusion 439 that is secured by a pin 442 to a bracket 444. The bracket 444 :is securely attached to an airplane structural member 446. A mechanism (not shown) is provided for rotating housing 438 from the stowed position shown in FIG. 10 to the extended position shown in FIG. 11. The housing 438 includes a clear lens 450 that is preferably abrasive-resistant such as a sapphire lens. A wiper housing 452 is mounted on the fuselage skin 436 such that a rubbery squeegee type cleaner 454 attached to the wiper housing 452 cleans the lens 450 as it moves between the retracted and extended positions. Widow cleaning may also be provided by compressed air (e.g., bleed air) combined with water, antifreeze, or a cleaning solution that is directed at the lens. A heater 456 located in the housing 438, or within the housing 410 of FIG. 9, prevents condensation of moisture on either the camera or the housing lenses. A preferred heater is an electrical forced air heater automatically or manually operated by commonly known control devices. Window heating may also be supplied by a conductive coating on the lens.

Figure 12:
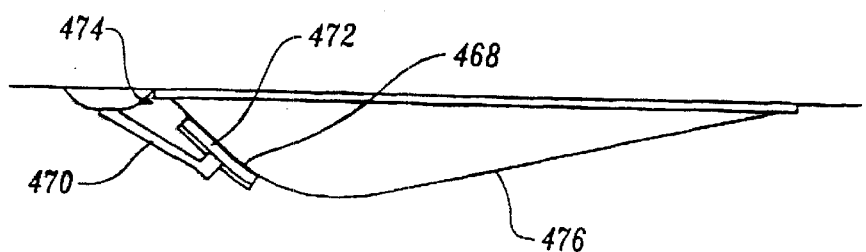
FIG. 12 is a side view of a washing mechanism for a camera lens cover.

FIG. 12 shows an alternate camera mounting structure. The camera mounting structure shown in FIG. 12 includes a camera fairing 476 for encasing a camera (not shown). The camera fairing includes a transparent front face 468. A washer nozzle 474 directs a cleaning fluid stored in a reservoir (not shown) at the transparent front face 468 when a pump (also not shown) is energized. A wiper blade 472 attached to a moving wiper arm 470 cleans the transparent front face 468 of the fairing 476 when a motor (not shown) that operates the wiper arm is energized.

Figure 13:
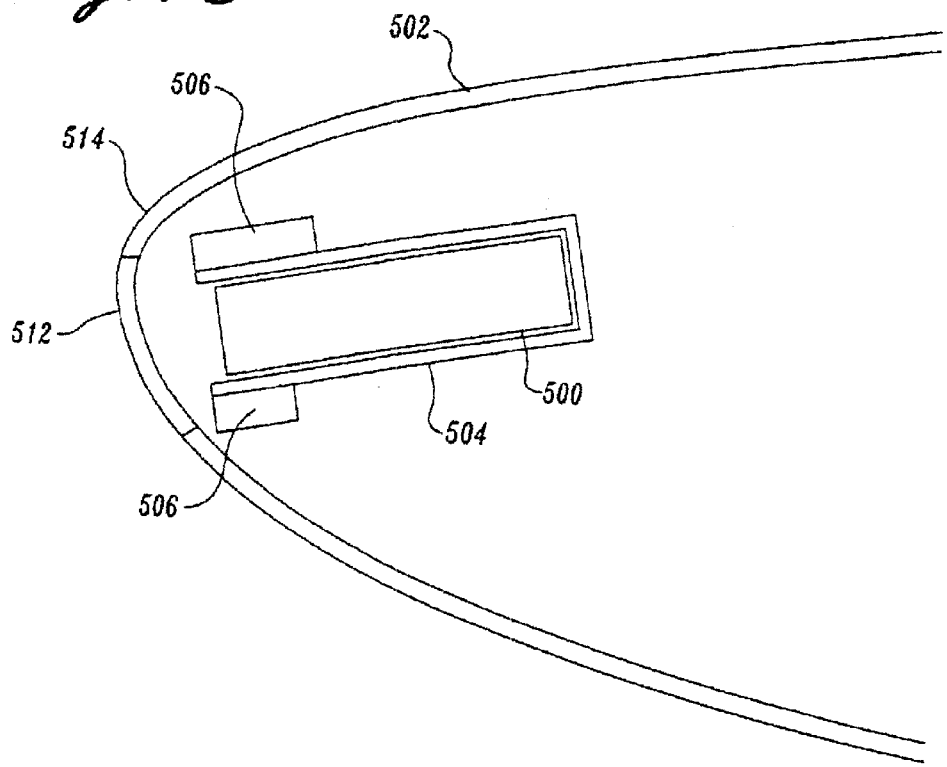
FIG. 13 is a cross-sectional view of a motion compensation system for a camera installed in a horizontal stabilizer.

FIG. 13 shows a mechanical device for orienting a stabilizer mounted camera 500 to compensate for pitch-axis rotational motion of a horizontal stabilizer 502. The camera 500 is rounded in a camera housing 504, which in turn is attached to a stabilizing mechanical device 506. The stabilizing mechanical device 506 provides movement or lilting of the camera housing 504 that is equal and to the motion of the horizontal stabilizer 502. As will be readily appreciated by those skilled in mechanical motion compensation devices, various types of mechanical devices, such as stepper motors, screw jacks, etc., can serve as the stabilizing mechanical device 506. A transparent window 512 on the stabilizer's leading edge 514 is large enough so that the camera can see forward over its entire allowed range of tilt.

Figure 14:
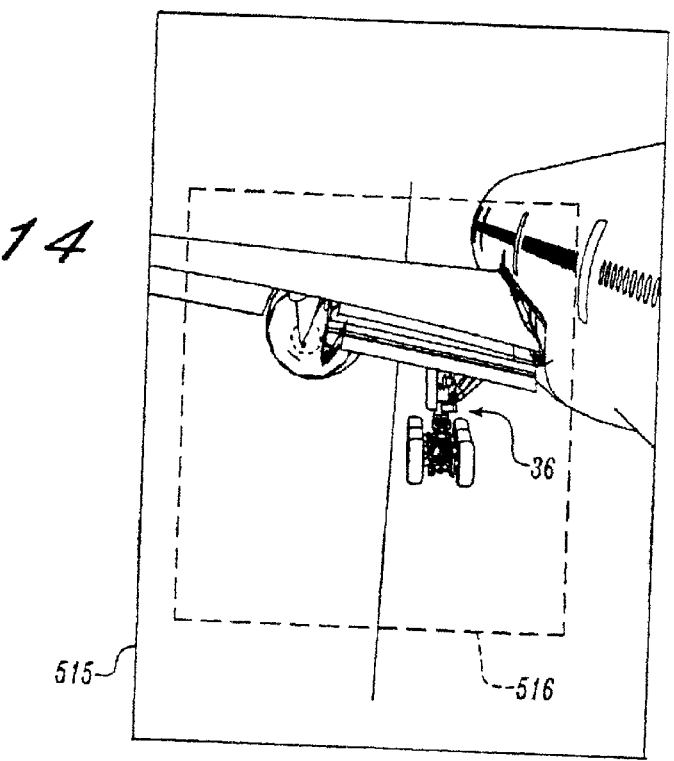
FIG. 14 is the field of view for a camera mounted in a horizontal stabilizer as shown in FIG. 13.

In an alternate structure a camera is mounted inside the horizontal stabilizer without any mechanical motion compensation mechanism, therefore, image motion compensation processing compensates for motion of the camera as the horizontal stabilizer moves. FIG. 14 illustrates an image 515 generated by a camera that is mounted inside a horizontal stabilizer without any mechanical motion compensation mechanism. When the horizontal stabilizer is trimmed up or down the image 515 pans up or down. If the image 515 is to be displayed with other camera generated images in a split screen or other specified format on a single cockpit display, the entire image 515 will not properly fit. Therefore, an image motion compensation processor compensates for motion of the camera by extracting a display view area 516 from the image 515, wherein the display view area 516 encompasses the field of view of interest to the pilot and is capable of fitting within the split screen. Preferably, the motion compensation processor uses a simple open-loop compensation algorithm using commanded or actual stabilizer (trim) angle as an input. The extraction of the display view area 516 can alternately be performed first by comparing the full image 515 with prestored display information, such as wing edge, fuselage edge or other display features, then, extracting the display view area 516 based on the comparison. As will be readily appreciated by those skilled in image analysis, other comparisons or analysis techniques can be performed to determine the portion of the full image 515 is to be displayed.

FIG. 15 illustrates, in block form, the major components of an airplane ground maneuvering camera system formed in accordance with the present invention. As shown, a processor 520 is coupled to a memory 522, one or more cameras 524 mounted on an airplane in the manner described above and one or more display devices 526 mounted in a cockpit in the manner described above The processor 520 may include an image analysis; component 528 and a target generator 530. FIG. 16A illustrates a proces's for aiding a pilot to steer an airplane that is implemented by the system components described in FIG. 15 above. At block 548, the processor 520 receives digitized or nondigitized images generated by the cameras 524. Next, at block 550, the image analysis component 528 of the processor 520 analyzes the digitized or nondigitized images by performing pattern recognition of the runway/taxiway centerline, edge markings or other displayed visual features that appear. Nondigitized images are digitized before pattern recognition is performed. At block 552, the target generator 530 of the processor 520 generates an oversteer target or other guidance features that are to be overlaid on the camera generated images based on the analysis of the digitized images. FIGS. 17–24, described below, illustrate a variety of examples of oversteer target and guidance features produced by the target generator 530. After the oversteer target and/or other guidance features are generated, at block 554, the generated oversteer target and other guidance features that are to be overlaid on the camera generated images are superimposed on the camera generated images and displayed on one or more of the display devices 526. The process described above occurs in real-time. Preferably, the processor 520 also generates automatic steering commands or drive warnings, such as an edge proximity warning, based on the analysis of the camera generated images. Automatic steering is described in more detail below.

FIG. 16B illustrates an alternate less computationally intensive process performed by a system similar to that shown in FIG. 15 except without the image analysis component 528 and the target generator 530. First, at block 556, one or more camera image is received. Next, at block 558, the location of the target is defined within the camera field of view. Then, at block 559, the received image is displayed and the target is displayed according to its defined location. The defining of the target location may be simply knowing what the camera field of view will be and placing an object physically on the display according to this known field of view or the target may be a portion of the screen, such as a corner of the display.

In a preferred embodiment, the target is located at a fixed and invariant location on the ground or in the field of view, and therefore requires no pattern recognition.

Alternatively, a computer controlled laser (not shown) attached to the airplane's fuselage could be used to direct a "real" target point that is visible in a camera generated image. Also, an airport layout map may be stored in the memory 522 and overlaid on the camera generated images by the processor 520 for providing guidance information during foul weather conditions.

Figure 17:
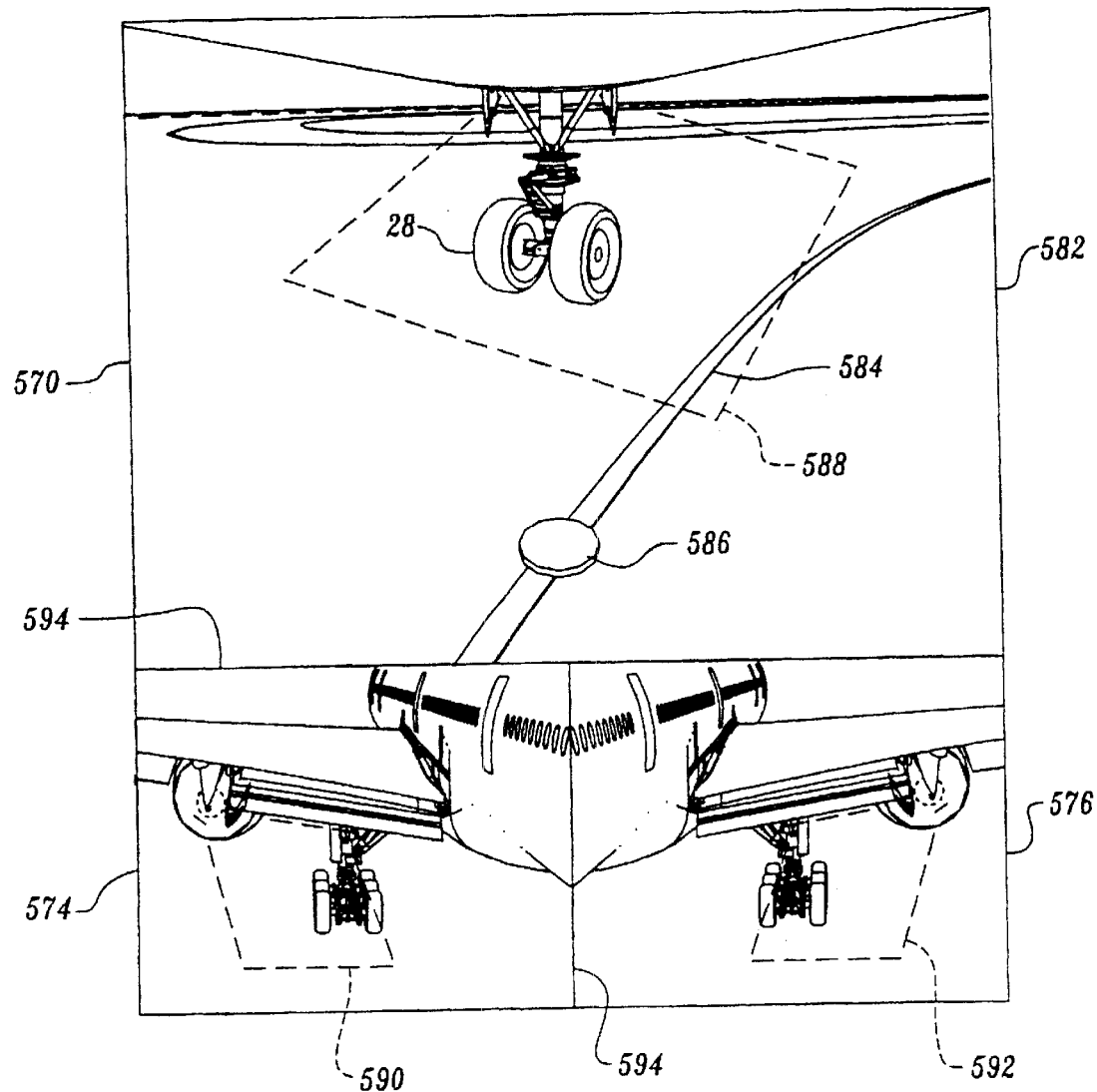
FIGS. 17–24 are camera generated images with superimposed processor generated features or targets.

FIG. 17 shows a three-way split-screen image 570 displayed on a cockpit display device. The split-screen image 570 includes a left main landing gear image 574, that is similar to the display view window 516 shown in FIG. 14, a right main landing gear image 576, and a nose landing gear image 582. The nose landing gear image 582 includes a taxiway pavement centerline 584 and a superimposed guide or target spot 586 that provides oversteer guidance. The illustrated target spot 586 is located at a selected distance behind the physical nosegear. The target spot 586 represents the position of a nosewheel located on an airplane closer to the main landing gear than is the case for the actual airplane generating the image. The relative positioning is such that when the pilot steers the airplane so that the superimposed target spot 586 follows the centerline 584, the airplane is properly oversteered in turns. In essence, the guided airplane performs similar to an airplane with a smaller wheelbase, obtaining a corresponding improvement in turn-inner side main landing gear edge margin to the runway or taxiway fillet pavement edge.

Also shown in FIG. 17 are minimum criterion areas 588, 590 and 592, one included in each of three images 574, 576 and 582. The minimum criterion areas 588, 590 and 592 are generated by the target generator 530 based on image analysis of the landing gear displayed in the three images 574, 576 and 582. The minimum criterion areas 588, 590 and 592 are dashed rectangular boxes that are displayed relative to the landing gear. The minimum criterion area 588 included in the nose landing gear image preferably extends 5 feet back, 30 feet forward, and 15 feet each to the right and left of the nose landing gear 28. The minimum criterion areas 590 and 592 included in the left and right main landing gear images 574 and 576 preferably extend inboard 0 feet, outboard 15 feet, and back 5 feet of the main landing gear, and forward up to the wing trailing edge and the engine cowling. More generally, the dimensions of the minimum criterion areas are set at values that provide visual cues to the pilots, e.g., pavement edge margins at the start and end of a U-turn maneuver. The visual cues are designed to produce safe ground maneuvering and avoid off-pavement excursions. In order to minimize visual pilot confusion, FIG. 17 includes a border 594 between the three camera generated images 574, 576 and 582. The thickness of the border 594 may be increased in order to provide greater visual separation.

Figure 18:
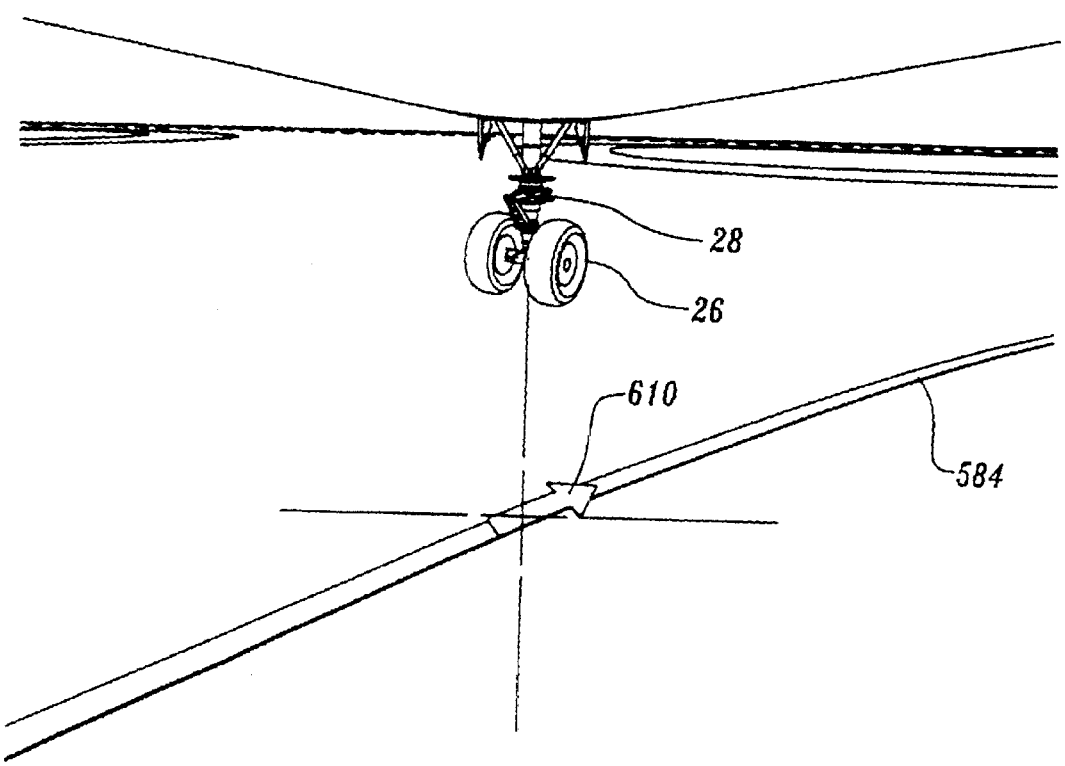

FIG. 18 is another example of a ground maneuvering image 608. The ground maneuvering image 608 shown in FIG. 18 includes a superimposed arrow symbol guide 610 generated by the target generator 530. The arrow symbol guide 610 indicates the location and direction of travel of a "virtual" nose of an airplane with a smaller wheelbase. When the pilot steers the airplane so that the arrow symbol guide 610 tracks the centerline 584, the airplane is properly oversteered. An algorithm based on nosewheel steering angle computes the direction of the arrow. The algorithm may also vary the length of the arrow to indicate speed.

Figure 19:
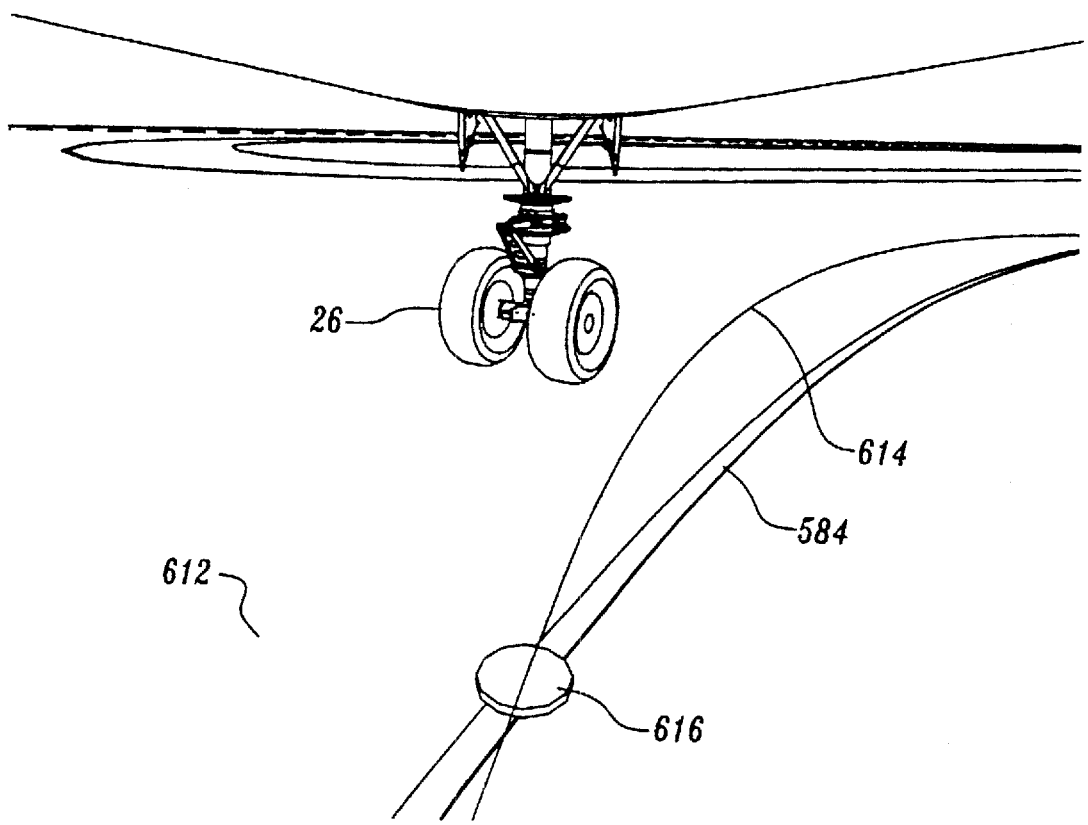

FIG. 19 is a further example of a ground maneuvering image 612. The ground maneuvering image 612 shown in FIG. 19 includes a projected target point path 614. Also included in the ground maneuvering image 612 is a target spot 616. As shown, the target s;pot 616 overlies centerline 584. As a result, as described above, the airplane is being properly oversteered. The projected target point path 614 is generated by the target generator 530 based on present steering inputs and illustrates the path the target point spot 616 will take if the present steering inputs remain unchanged. Thus, the projected target point path 614 alerts a pilot to the change necessary in order to maintain the target spot over the centerline 584.

Figure 20A:
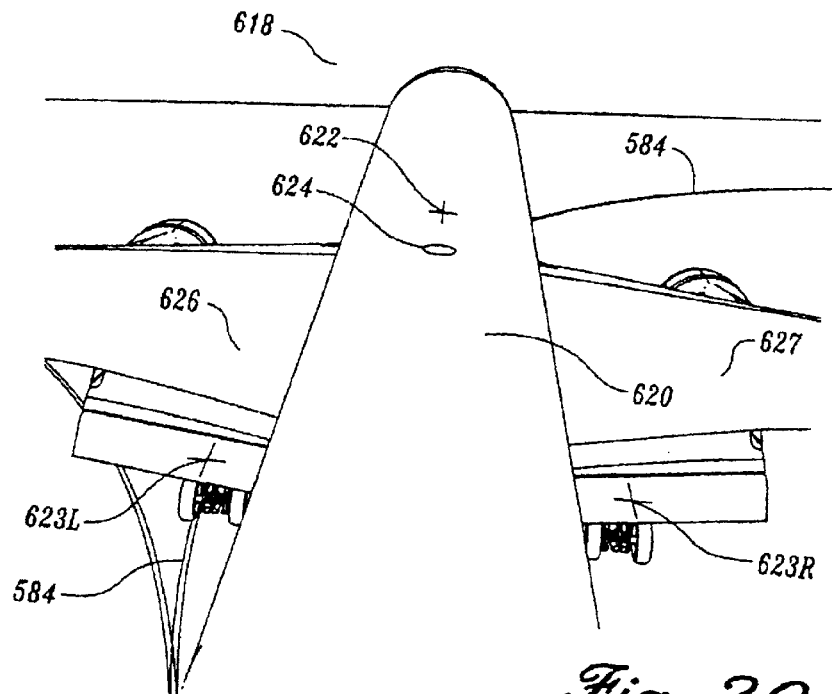

FIG. 20A illustrates yet another example of a ground maneuvering image 618. The ground maneuvering image 618 shown in FIG. 20A includes an image generated by a forward and downward looking camera that is installed on the vertical stabilizer or fin of an airplane. The image 618 includes the top of the airplane fuselage 620, part of the left and right wings 626 and 627 and the area ahead of the airplane. The centerline 584 of the taxiway/runway pavement on which the airplane is located is visible ahead of and to the right of the fuselage 620, and behind the left wing 626. Features or symbols 622, 623L and 623R, marked or painted on the airplane fuselage 620 and the flaps of the left and Tight wings 626 and 627 respectively, or generated by the target generator 530 and superimposed on the airplane shown in the ground maneuvering image 618 by the processor 520, indicate to the pilot where the nose landing ;gear, left main landing gear, and right main landing gear are located relative to the taxiway/runway pavement. A target symbol 624, also marked or painted on the airplane, or superimposed on the ground maneuvering image 618 by the processor 520 indicate to the pilot the location of an oversteer target point. A proper oversteer maneuver is executed by the pilot steering the airplane so that the target symbol 6:24 moves along the centerline 584.

Figure 20B:
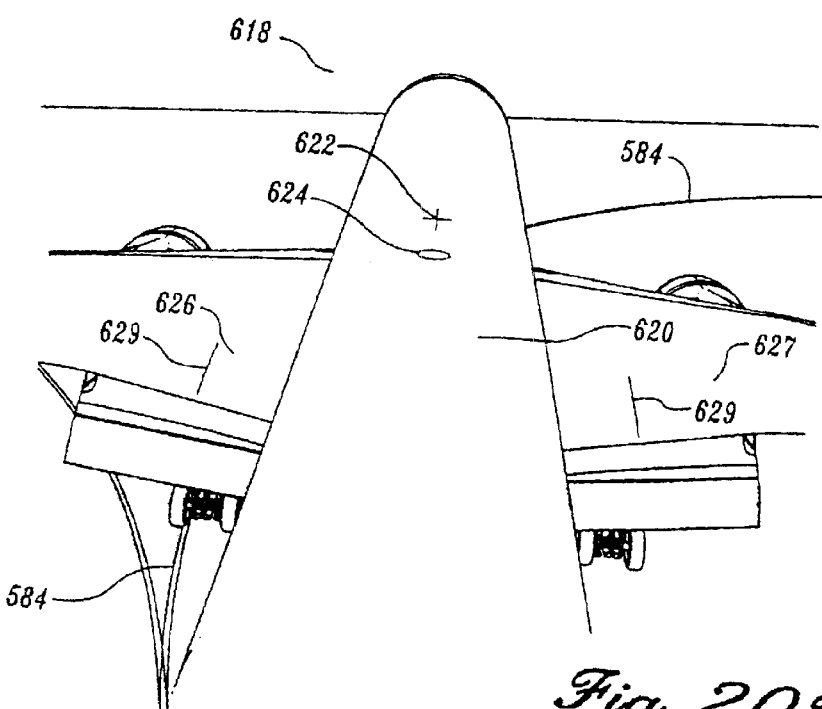

FIG. 20B illustrates still yet another example of a ground maneuvering image 618. Displayed on the wings 626 and 627 are edge lines 629. These lines are painted on the plane, painted on the display or generated using image analysis. These lines are positioned to allow the pilot to quickly determine the location of the outer edge of the main landing gear. This allows for better line-up with runway/turnpad edges at the start of a U-turn. During high glare situations, the main landing gear is difficult if not impossible to see, however, edge lines 629 are always discernible in the display.

Figure 21:
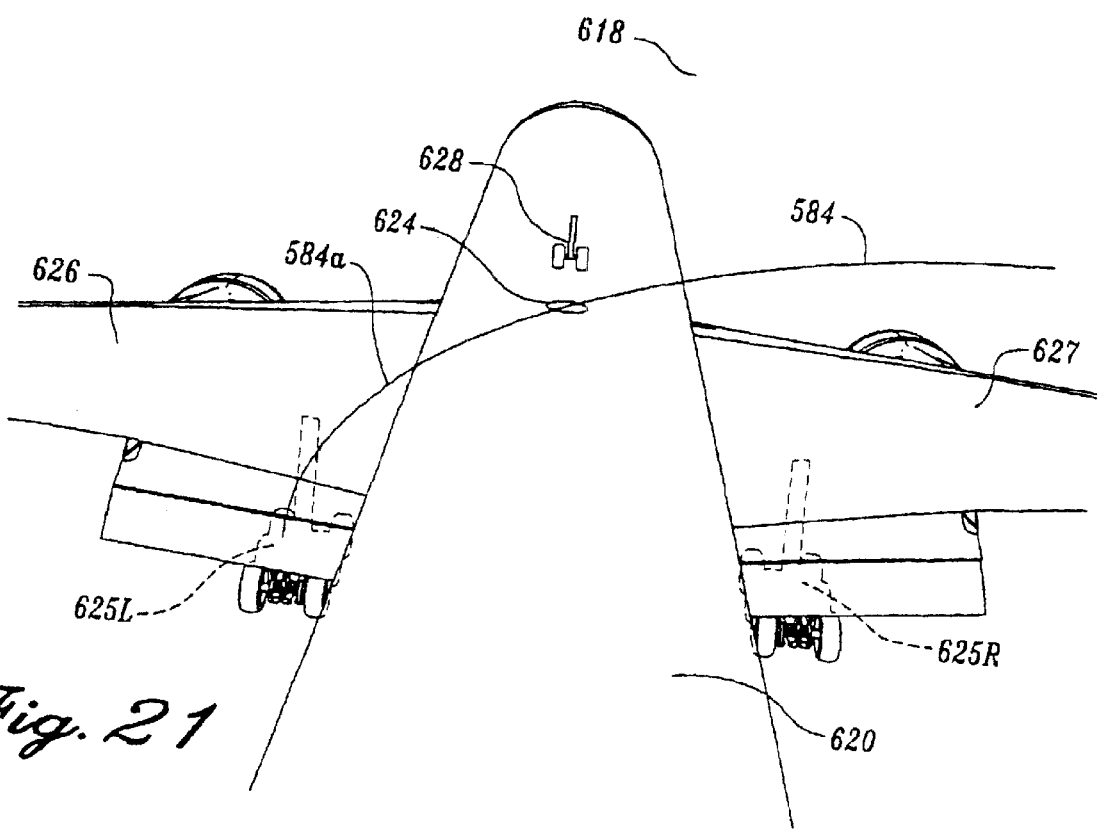

FIG. 21 is similar to FIG. 20A with the addition of a left main landing gear symbol 625L, a right main landing gear symbol 625R and a nose landing gear symbol 628 all produced by the target generator 530 and superimposed on the ground maneuvering image 618 by the processor 520 at their appropriate location on the image of the airplane. FIG. 21 also includes a centerline feature 584a. The centerline feature 584a is the portion of the centerline 584 that is visually blocked by the airplane fuselage 620 and the airplane's wings 626, 627. The centerline feature 584a is generated by the target generator 530 based on the actual centerline 584 and overlaid on the image of the airplane.

Figure 22:
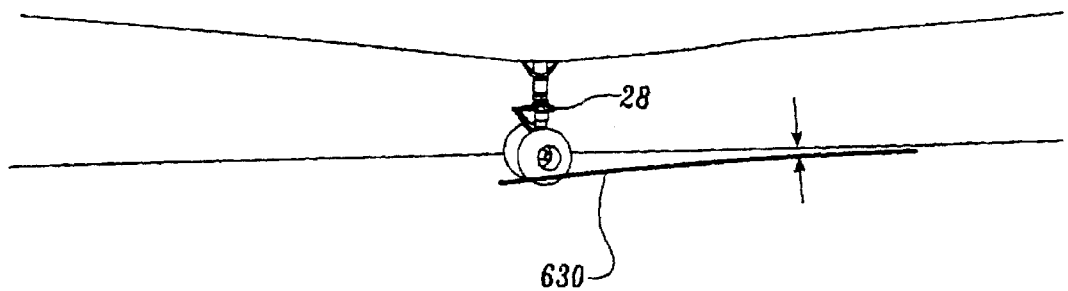

As shown in FIG. 22, similar to FIG. 19, a nose landing gear projected track line 630 generated by the processor 520 is a predicted track of the nose landing gear 28 with the current steering inputs. The nose landing gear track line 630 aids a pilot for following a taxiway guideline (the pilot can see if his predicted track deviates from the guideline), and for performing U-turns on narrow turnpads or runways. For example, as the nosewheels approach the far edge of the runway during a U-turn, the predicted track will indicate if the nosewheels will stay within the far edge of the runway well before they get dangerously close.

Figure 23:
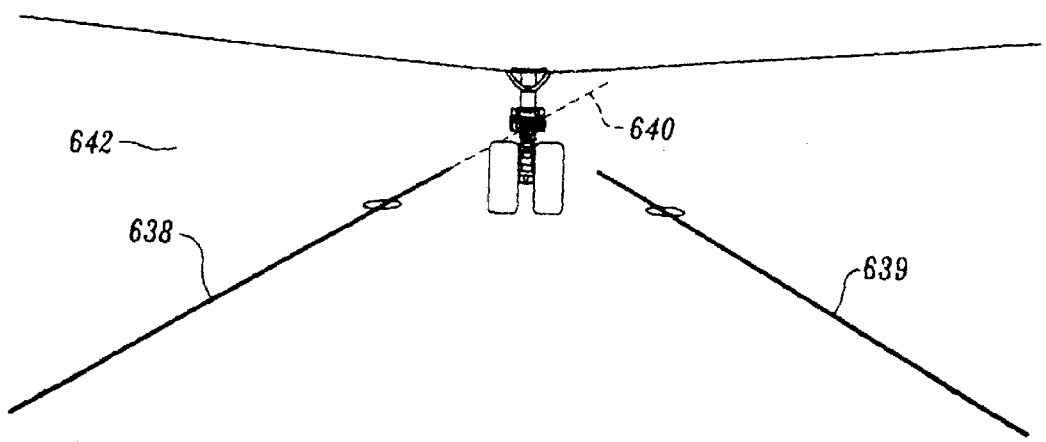

As shown in FIG. 23, the target generator 530 can also generate main landing gear clearance guidelines 638 and 639 superimposed on the image 642 generated by a nose landing gear camera by the processor 520. The main landing gear clearance guidelines 638 and 639 allow the pilot to determine in a single view what obstacles are near the nose landings gear and the lateral distance of the main landing gear from linear taxiway features (such as a runway or taxiway edge) or other objects. The guidelines 638 and 639 are displayed in such a way that when a guideline 638 or 639 is aligned with the runway or taxiway edge line 640, the main landing gear clearance is attained. As shown, the guideline 638 is co-located with the taxiway edge line 640, thereby indicating that the left main landing gear has proper clearance with respect to the taxiway edge line 640. This capability is useful for maximizing the space available for a ground maneuver by minimizing the clearance between the main landing gear and the edge of the runway or taxiway.

Figure 24:
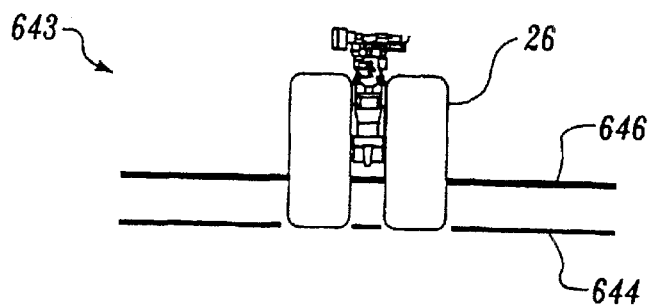

FIG. 24 illustrates a nosewheel ground maneuver image 643 that includes a synthesized stopping guideline (544 superimposed on the view of the displayed nosewheel tires 26. Then, the stopping guideline 644 is displayed based on the image comparison. The stopping guideline 644 is displayed such that when the guideline 644 is exactly aligned with a painted stop line 646 on the ramp, the nosewheel tires 26 will be directly over the stop line 646. The stopping guideline 644 allows the pilot to accurately determine when the nosewheel tires 26 are in exact alignment with a stop line 646 painted on the ramp surface.

Figure 25:
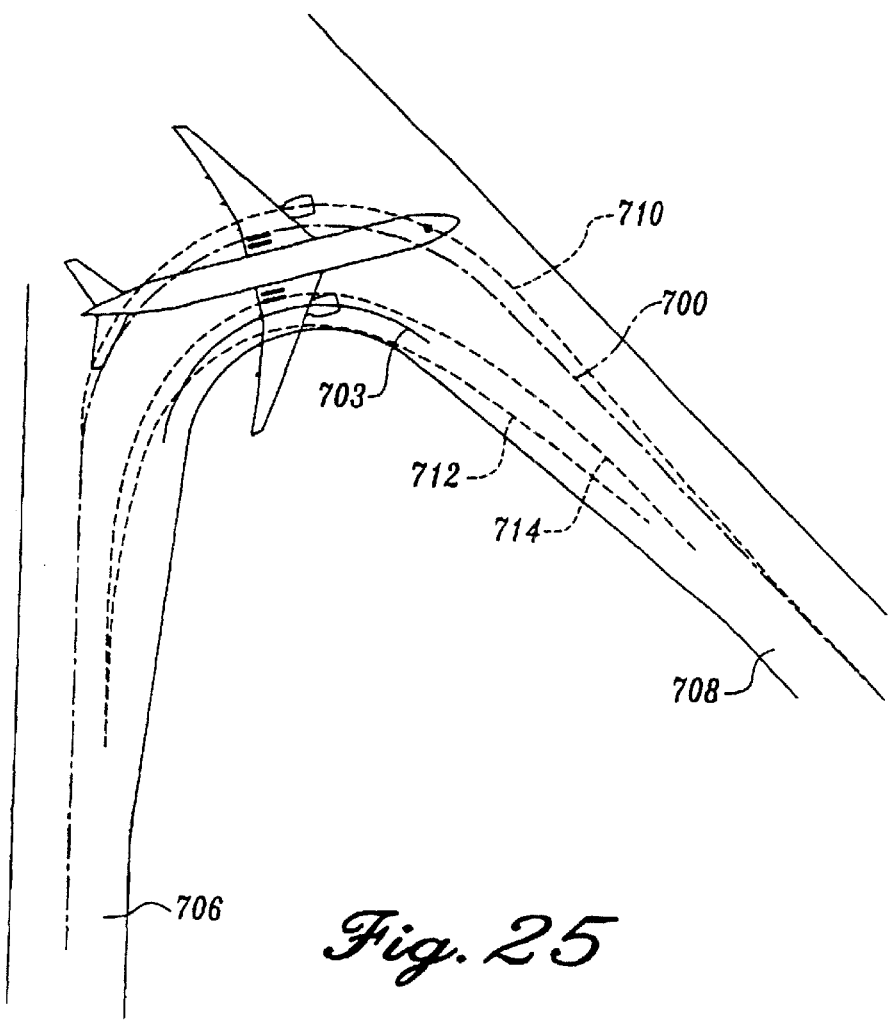
FIG. 25 is an overhead view of airplane maneuvering with the aid of the present invention.

FIG. 25 illustrates a taxiway 706 to taxiway 708 turn. A nosewheel guideline 700 is painted on the taxiway turn connecting the taxiway centerlines on taxiways 706 and 708. The nosewheel guideline provides a typical 150-foot radius curve between the two adjoining taxiways 706 and 708. A large commercial airplane that executes a taxiway turn with its nose landing gear following the guideline 700 could have a taxiing problem because the right main landing gear of the airplane will come very close to or may even cross over a fillet pavement edge 703 of the adjoining taxiways 706 and 708, as shown by line 712. The illustrated airplane is shown executing a "camera-aided oversteer" turn using an airplane ground maneuvering camera system formed in accordance with the invention. As described above, the airplane ground maneuvering camera system generates a target point. If the pilot maintains the target point over the nosewheel guideline as the pilot steers the airplane, the nosewheels of the airplane will follow a nose landing gear path 710 that has greater radius of curvature than the nosewheel guideline 700. Following this nosewheel path results in the right main landing gear following a path 714 that avoids the fillet pavement edge 703.

Cameras of a variety of typos may be used within the scope of the invention. For example, low-light cameras or infrared cameras may be used. Cameras may include the capability to vary the width of a view (i.e., zoom) or the direction of a view (i.e., pan).

Camera generated images are displayed to the pilot in real-time, thereby allowing pilots to execute sharper turns, avoid hazards and prevent damage to the airplane or airport. The results are: properly oversteered airplanes during taxiway to taxiway turns and safer U-turns and gate entry maneuvers. If desired, the video images may be saved on tape or other recording media for later review. All images generated by the present invention could alternatively be used for cabin entertainment purposes.

While the preferred embodiment of the invention has been illustrated and described, it will be appreciated that within the scope of the appended claims various changes can be made therein without departing from the spirit of the invention.

The embodiments of the invention in which an exclusive property or privilege is claimed are defined as follows:

1. A system for aiding ground maneuvering of an airplane fitted with at least two main landing gear located beneath the right and left airplane wings, respectively, and a nose landing gear located forward of said main standing gear, said at least two main landing gear and said nose landing gear each including tires, said system comprising:

a first camera for generating video images of the tires of said nose landing gear and a predefined area of ground around said nose landing gear;

a second camera for generating video images of the tires of at least one of said at least two main landing gear and a predefined area of ground around said at least one of said at least two main landing gear; and video display means in the cockpit of said airplane for displaying said generated video images generated by said first and second cameras;

wherein said second camera is mounted on a movable component of said airplane;

wherein said movable component is a trimmable stabilizer, and further comprising electronic compensation means, responsive to a signal corresponding with stabilizer trim position, for generating a video field of view for display which is substantially unaffected by trimming movements of said stabilizer.

2. A system for aiding ground maneuvering of an airplane fitted with at least two main landing gear located beneath the right and left airplane wings, respectively, and a nose landing gear located forward of said main landing gear, said at least two main landing gear and said nose landing gear each including tires, said system comprising:

a first forward view camera for generating video images of the tires of said nose landing rear and a predefined area of ground around said nose landing gear;

a second forward view camera for generating video images of the tires of at least one of said at least two main landing gear and a predefined area of the ground around said at least one of said at least two main landing gear;

a video display means adapted for mounting in the cockpit of said airplane wherein said video display means displays said generated video images generated by said first and second cameras;

wherein said second camera is adapted for mounting on a moveable component of said airplane; and wherein said second camera is mounted on a movable device for compensating for movement of the moveable component, such that the video images generated by the second camera are substantially unaffected on the video display means when the moveable component moves.

3. The system of claim 2, wherein said second camera is adapted for mounting on the horizontal stabilizer of the airplane.

4. A system for aiding ground maneuvering of an airplane fitted with at least two main landing gear located beneath the right and left airplane wings, respectively, and a nose landing gear located forward of said main landing gear, said at least two main landing gear and said nose landing gear each including tires, said system comprising:

a first camera for generating video images of the tires of said nose landing gear and a predefined area of ground around said nose landing gear;

a second camera for generating video images of the tires of at least one of said at least two main landing gear and a pre defined area of ground around said at least one of said at least two main landing gear; and video display means in the cockpit of said airplane for displaying said generated video images generated by said first and second cameras;

wherein at least one of said first and second cameras is movable between a stowed and a deployed position, and comprises:
a transparent lens; and
a cleaning mechanism for cleaning said transparent lens as the camera is moved between the stowed and deployed positions.

5. The system of claim 4, wherein said cleaning mechanism is a squeegee.

6. An oversteering system for assisting a pilot in maneuvering a large airplane based on a nosewheel guideline on a paved airport surface, wherein said large airplane is fitted with landing gear, said landing gear including main landing gear and a nose landing gear located forward of said main landing gear, said main landing gear and said nose landing gear including tires, said system comprising:
at least one camera for generating video images of at least one tire of said nose landing gear and a predefined area of ground around said nose landing gear;
a video display adapted for mounting in the cockpit of said airplanes for displaying said generated video images; and
a visual means for visually identifying an oversteer target on said video display.

7. The system of claim 6, further comprising:
an image motion compensation processor for analyzing the generated video images.

8. The system of claim 6, further comprising:
a display generator for generating and superimposing an image on the displayed video images at the location of said oversteer target, based on the analysis of the generated video images, for assisting the pilot in maneuvering the airplane.

9. The system of claim 8, wherein said generated and superimposed image is the oversteer target that is superimposed on the displayed video images, and wherein the airplane is properly oversteered when the oversteer target tracks along a displayed guideline.

10. The system of claim 8, wherein said generated and superimposed image is a prediction track of the nose landing gear.

11. The system of claim 8, wherein said generated and superimposed image is a prediction track of the oversteer target.

12. The system of claim 8, wherein said generated and superimposed image is a landing gear identifier for identifying the location of the landing gear of the airplane.

13. The system of claim 8, wherein said generated and superimposed image is a guideline identifier for identifying any portion of the guideline that is visually blocked by the airplane.

14. The system of claim 8, wherein said generated and superimposed image is a lateral guideline identifier for identifying a lateral guideline on the displayed video images for showing lateral clearance of the main landing from airport surface markings and equipment.

15. The system of claim 8, wherein said generated and superimposed image is a minimum criterion area identifier for identifying a minimum criterion area around the displayed image of the tires of at least one of the landing gear, said minimum criterion area defining a predetermined safety area for alerting the pilot of the airplane about impending obstacles.

16. The system of claim 8, wherein said generated and superimposed image is a stop line, said stop line indicating where the tires of the landing gear contact the paved airport surface.

17. The system of claim 6, wherein said oversteer target is situated at a particular location relative to said nose landing gear.

18. The system of claim 6, wherein said visual means comprises a field of view on said visual display, wherein said oversteer target is displayed substantially on a corner of said field of view.

19. The system of claim 6, wherein said visual means comprises a field of view on said visual display, wherein said oversteer target is displayed substantially on an edge of said field of view.

20. The system of claim 6, wherein the oversteer target indicates airplane direction.

* * * * *